US007295944B2

(12) United States Patent
Morton et al.

(10) Patent No.: US 7,295,944 B2
(45) Date of Patent: Nov. 13, 2007

(54) CROSS-CALIBRATION OF PLANT INSTRUMENTS WITH COMPUTER DATA

(75) Inventors: Gregory W. Morton, Knoxville, TN (US); Brent D. Shumaker, Knoxville, TN (US); Hashem M. Hashemian, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 47 days.

(21) Appl. No.: 10/786,197

(22) Filed: Feb. 25, 2004

(65) Prior Publication Data

US 2005/0187730 A1 Aug. 25, 2005

(51) Int. Cl.
*G01K 15/00* (2006.01)
*G01K 19/00* (2006.01)

(52) U.S. Cl. ........................................................ 702/99

(58) Field of Classification Search .................. 702/85, 702/99, 130–132, 182–185
See application file for complete search history.

(56) References Cited

U.S. PATENT DOCUMENTS

| | | | | |
|---|---|---|---|---|
| 5,105,372 | A * | 4/1992 | Provost et al. | 702/185 |
| 6,915,237 | B2 * | 7/2005 | Hashemian | 702/183 |
| 6,973,413 | B2 * | 12/2005 | Hashemian | 702/183 |
| 7,254,520 | B2 * | 8/2007 | Hashemian | 702/183 |

* cited by examiner

*Primary Examiner*—Michael Nghiem
(74) *Attorney, Agent, or Firm*—Knox Patents; Thomas A. Kulaga

(57) ABSTRACT

Methods and apparatus for an automated system for cross calibration based on data stored by a plant computer and data storage unit or a plant monitoring system. The automated system includes a processor executing software for retrieving data, determining average temperatures, determining deviations, and determining new calibration curve coefficients for deviating instruments. In another embodiment, the processor executes software for loading the historical data, selecting data points, removing deviate data, analyzing the data, reporting the data, and for recalibrating instruments that were determined to be deviating.

9 Claims, 40 Drawing Sheets

RTD Recalibration

3802

Tag

1BB-T-0450-W

3804

Recal Data

| RCS Temp. (°C) | Res. (ohms) | Uncertainty (°C) |
|---|---|---|
| 292.81 | 209.212 | 0.047 |
| 279.50 | 204.469 | 0.047 |
| 266.20 | 199.705 | 0.047 |
| | | |

3806

Quadratic Calibration

| Constant | Original | New Calibration | Units |
|---|---|---|---|
| Ro | 99.943 | 99.189 | Ohms |
| A | 3.902351E-3 | 3.993068E-3 | 1/°C |
| B | -5.822314E-7 | -6.997264E-7 | 1/°C/°C |

3808

RTD Recalibration Uncertainty

3902

Tag

1BB-T-0450-W

3904

Recal Data

| Temperature (°C) | Resistance (ohms) | Uncertainty (°C) |
|---|---|---|
| 292.81 | 209.212 | 0.047 |
| 279.50 | 204.469 | 0.047 |
| 266.20 | 199.705 | 0.047 |
| | | |
| | | |

RTD Calibration Table

4002 Tag

1BB-T-0450-W

4004 Calibration Constants

| Constant | Value | Units |
|---|---|---|
| Ro | 99.189 | Ohms |
| A | 3.993068E-3 | 1/°C |
| B | -6.997264E-7 | 1/°C/°C |

4004 Cal Resistance (ohms)

| Temp (°C) | +0 | +1 | +2 | +3 | +4 | +5 | +6 | +7 | +8 | +9 |
|---|---|---|---|---|---|---|---|---|---|---|
| 0 | 99.19 | 99.59 | 99.98 | 100.38 | 100.77 | 101.17 | 101.56 | 101.96 | 102.35 | 102.75 |
| 10 | 103.14 | 103.54 | 103.93 | 104.33 | 104.72 | 105.11 | 105.51 | 105.90 | 106.30 | 106.69 |
| 20 | 107.08 | 107.48 | 107.87 | 108.26 | 108.66 | 109.05 | 109.44 | 109.83 | 110.22 | 110.62 |
| 30 | 111.01 | 111.40 | 111.79 | 112.18 | 112.58 | 112.97 | 113.36 | 113.75 | 114.14 | 114.53 |
| 40 | 114.92 | 115.31 | 115.70 | 116.09 | 116.48 | 116.87 | 117.26 | 117.65 | 118.04 | 118.43 |
| | | | | | | | | | | |
| 50 | 118.82 | 119.21 | 119.60 | 119.99 | 120.37 | 120.76 | 121.15 | 121.54 | 121.93 | 122.32 |
| 60 | 122.70 | 123.09 | 123.48 | 123.87 | 124.25 | 124.64 | 125.03 | 125.41 | 125.80 | 126.19 |
| 70 | 126.57 | 126.96 | 127.35 | 127.73 | 128.12 | 128.50 | 128.89 | 129.28 | 129.66 | 130.05 |
| 80 | 130.43 | 130.82 | 131.20 | 131.59 | 131.97 | 132.35 | 132.74 | 133.12 | 133.51 | 133.89 |
| 90 | 134.27 | 134.66 | 135.04 | 135.42 | 135.81 | 136.19 | 136.57 | 136.96 | 137.34 | 137.72 |
| ⋮ | ⋮ | ⋮ | ⋮ | ⋮ | ⋮ | ⋮ | ⋮ | ⋮ | ⋮ | ⋮ |
| 350 | 229.31 | 229.66 | 230.01 | 230.35 | 230.70 | 231.05 | 231.39 | 231.74 | 232.09 | 232.43 |
| 360 | 232.78 | 233.13 | 233.47 | 233.82 | 234.16 | 234.51 | 234.85 | 235.20 | 235.54 | 235.89 |
| 370 | 236.23 | 236.58 | 236.92 | 237.27 | 237.61 | 237.96 | 238.30 | 238.64 | 238.99 | 239.33 |
| 380 | 239.67 | 240.02 | 240.36 | 240.70 | 241.05 | 241.39 | 241.73 | 242.07 | 242.42 | 242.76 |
| 390 | 243.10 | 243.44 | 243.78 | 244.13 | 244.47 | 244.81 | 245.15 | 245.49 | 245.83 | 246.17 |

Fig. 40

CROSS-CALIBRATION OF PLANT INSTRUMENTS WITH COMPUTER DATA

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to methods and apparatus for performing RTD and thermocouple cross-calibration in nuclear power plants. More particularly, this invention pertains to using data acquired by a plant monitoring system to calibrate hot leg and cold leg temperature instrumentation in a pressurized water reactor.

2. Description of the Related Art

Pressurized water reactors (PWRs) produce heat through a nuclear reaction in a reactor vessel. The heat is extracted from the reactor vessel by pumping water from the reactor vessel to one or more steam generators. The steam generator is a heat exchanger that extracts the heat from the reactor water into steam that drives a turbine. The piping carrying the heated water from the reactor vessel is called the hot leg, and the piping carrying the cooled water back into the reactor vessel is called the cold leg.

In order to maintain control of the reactor system, the temperature of the reactor water in the hot leg and the cold leg is monitored during reactor start up, shut down, and normal operation. It is common practice to use redundant resistance temperature devices (RTDs) in this application.

Additionally, the temperature of the heated water as it leaves the reactor core is measured by core-exit thermocouples (CETs). A core-exit thermocouple system allows the continuous, on-line monitoring of the coolant temperature at the exit of about one fourth of the fuel assemblies. In present practice, these core-exit thermocouples are installed at or just above the outlet nozzles of a fraction of the fuel assemblies in most commercial pressurized water nuclear power reactors. Typical reactor cores generally consist of from approximately one hundred to more than two hundred fuel assemblies and the core-exit thermocouples are usually located at approximately one out of four fuel assemblies.

Typically, an on-line plant process control computer periodically samples the hot and cold leg RTD resistance and the core-exit thermocouple voltages. These values are converted to convenient engineering units, for example, degrees Fahrenheit or degrees Celsius.

The temperatures measured by the RTDs and CETs are used by the plant operators for process control and to assess the safety of the plant as well as the overall efficiency of power generation. Because the measurements of the RTDs and CETs play a critical role in the evaluation of the plant's operating status, the calibration of the RTDs and CETs are normally evaluated at least once every refueling cycle. Because of plant operating constraints, calibration typically occurs during plant shutdown periods, such as when the reactor core is being refueled, which can occur on an 18-month cycle. Each RTD and CET instrument must meet specific requirements for the plant to continue to produce power according to its design specifications.

In a typical nuclear power plant design, redundant RTDs and CETs are placed in the plant's fluid loops to minimize the probability of failure of any one RTD or CET having a serious effect on the operator's ability to safely and efficiently operate the plant. This redundancy of temperature measurements is the basis for a method of evaluating the calibration of RTDs and CETs called 'cross calibration'. In cross calibration, redundant temperature measurements are averaged to produce an estimate of the true process temperature. The measurements of each individual RTD and CET are then compared with the process estimate. If the deviations from the process estimate of an RTD or CET is within acceptable limits, the sensor is considered in calibration. However, if the deviation exceeds the acceptance limits, the sensor is considered out of calibration and its use for plant operation must be evaluated.

FIG. 1 illustrates two prior art methods of performing cross calibrations, along with a third method in accordance with the present invention. The plant process 102 is monitored by plant instruments 104, such as RTDs and CETs. The first prior art method of performing cross calibrations is to collect manual measurements 106 of the instruments, and then perform manual calculations 108 to produce the cross calibration results 110. A second prior art method of performing cross calibrations is to use a dedicated data acquisition system 112 to collect the data and produce the results 114. The typical process for performing the cross-calibration occurs when the plant is shutting down for a refueling outage or starting up after an outage when the fluid temperatures go through ranges allowing measurements over the sensor range. The procedure for obtaining the sensor measurements involves physically disconnecting the RTDs or CETs from the plant indications and making measurements using a multimeter or dedicated data acquisition systems. The measurement data is then presented to the plant engineers and used to assess the sensor calibrations with the help of software or manual calculations. After the cross calibration analysis is performed the sensors are connected to the instrumentation to provide indication to the operators.

These prior art methods have the disadvantage of removing the instruments from service for the period measurements are taken, resulting in less information being provided to the plant operators. Additionally, the prior art methods require time and manpower to perform the cross calibrations. Attaching the equipment for the manual measurements 106 or the dedicated data acquisition system 112 requires a trained technician to make the connections and take the actual measurements.

BRIEF SUMMARY OF THE INVENTION

According to one embodiment of the present invention, an automated system for cross calibration is provided. Information and data is extracted from a plant computer or on-line monitoring system. This information and data is processed to perform a cross calibration check of the instruments. The processing of the information and data is performed by a computer system running software.

In one embodiment, the software includes routines to load a data set from the plant monitoring system, to select a set of data to analyze, to remove deviating data, to analyze the remaining data, and to recalibrate any deviating instruments. In another embodiment, the software includes routines to retrieve data from the plant monitoring system, to perform averaging calculations, to identify outliers, and to calculate new calibration curves for the outliers.

BRIEF DESCRIPTION OF THE SEVERAL VIEWS OF THE DRAWINGS

The above-mentioned features of the invention will become more clearly understood from the following detailed description of the invention read together with the drawings in which:

FIG. 40 illustrates an example screen shot of an RTD calibration table.

DETAILED DESCRIPTION OF THE INVENTION

Methods and apparatus for an automated system for cross calibration are disclosed. The invention will be described as applied to a pressurized water reactor (PWR) for generating electric power. The invention, however, is applicable to other processes in which a multitude of sensors monitor a process.

Figure 1:
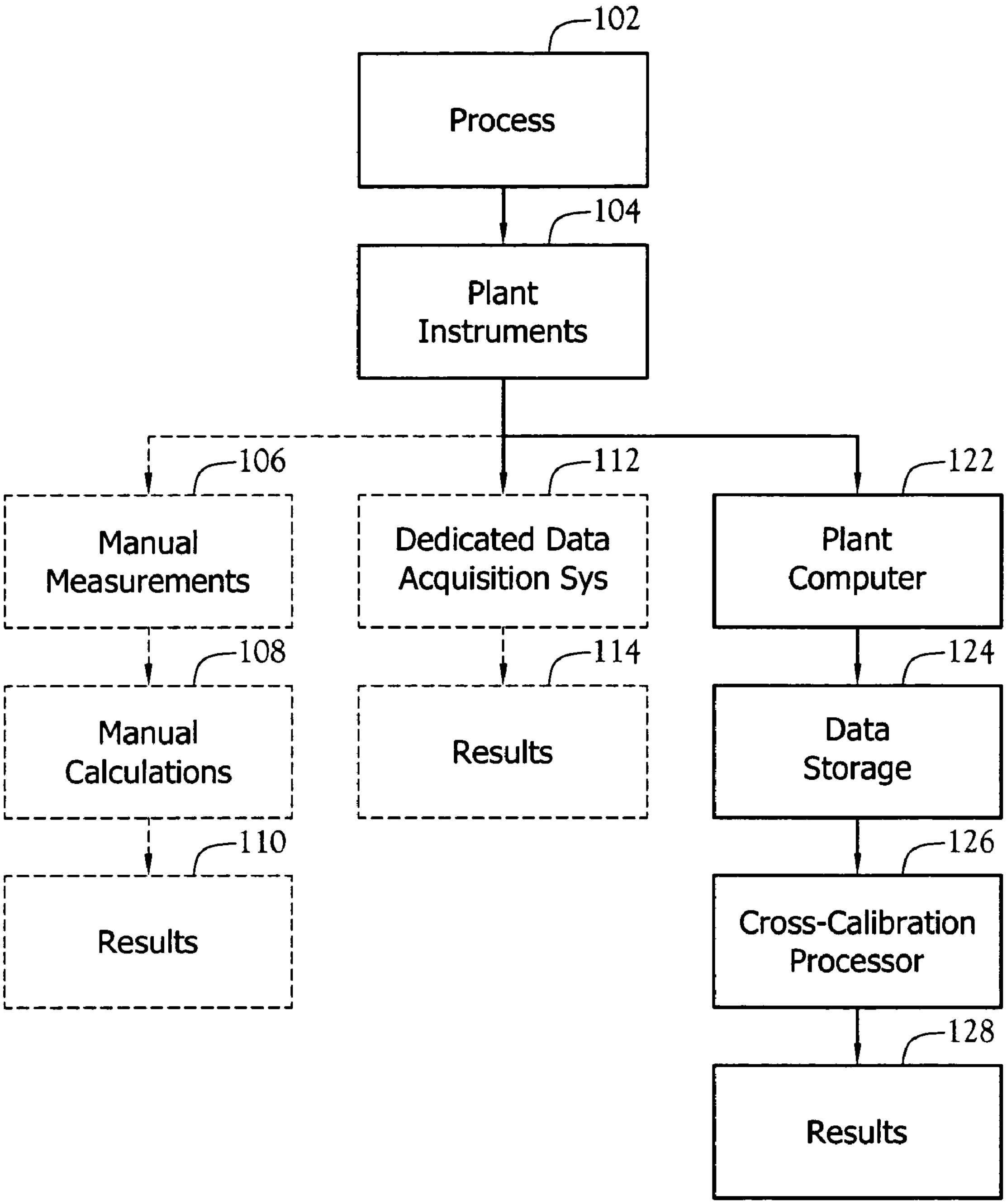
FIG. 1 is a block diagram of one embodiment of the present invention integrated into a plant monitoring system.

FIG. 1 illustrates a block diagram of both the prior art methods and the present invention. The plant process 102 is monitored by plant instruments 104, such as RTDs and CETs. As described above, cross calibration can be performed either by manually measuring 106 the instruments 104 and then performing manual calculations 108 to obtain the results 110 or by using a dedicated data acquisition system 112 to collect and analyze the data and produce the results 114.

In a typical plant environment, the plant instruments 104 provide data to a centralized plant computer 122 that monitors the instruments 104 and stores the instrument measurements in a data storage unit 124. The plant computer 122 performs data acquisition for the plant, collecting process information from various instruments. In the present invention, a cross calibration processor 126 interrogates, or communicates with, the data storage unit 124 of the plant computer 122 and processes the instrument data to produce the cross calibration results 128. The data storage unit 124, in one embodiment, is a standalone storage unit with its own processor. In another embodiment, the data storage unit 124 is a disk farm or array for storing data processed by the plant computer 122.

In the past, the plant data acquisition system (plant computer 122 and data storage 124) has been a prohibitive factor in the storing of plant computer data at sampling rates sufficient for cross calibration analysis. However, recent advances in technologies for monitoring and storing large amounts of data and their adoption in nuclear plant information systems have made it possible to acquire and store data at adequate sampling rates for performing cross-calibration without the need for dedicated data acquisition equipment. For example, only recently have equipment become available that makes it practical to monitor an instrument at one second intervals.

The database maintained by the plant computer 122 is interrogated to provide the necessary data to perform cross calibration analysis of RTDs and CETs. More specifically, the system involves software and a computer or other equipment to extract and analyze data from the database to verify the calibration of various temperature sensors. The system uses data from all temperature regions to verify the performance of the instruments over their entire operating range. For example, temperature data is collected from redundant temperature sensors during plant start-up (heatup) or shut down (cool down) at temperature ramp conditions to verify the calibration of temperature sensors over a wide range and to help develop new calibration curves for a sensor that fails the test. The latter amounts to in-situ recalibration of the sensor. This recalibration provides an option to perform a linear correction between the original calibration curve and the new calibration data that is necessary when recalibrating a narrow range RTD over its temperature region.

The temperature region is a portion of the temperature range in which multiple instruments provide measurements. For example, during plant startup, the temperature of the primary loops slowly increases with the wide range temperature instruments reading the temperature over the full range and the narrow range instruments reading the temperature as the temperature approaches the operation temperature. For a particular temperature range to be used for cross-calibration, in one embodiment, three regions are defined. Roughly, these three regions correspond to a smaller range within the lower, mid, and upper portion of the temperature range.

As used herein, the cross calibration processor 126 should be broadly construed to mean any computer or component thereof that executes software. The processor 126 includes a memory medium that stores software, a processing unit that executes the software, and input/output (I/O) units for communicating with external devices. Those skilled in the art will recognize that the memory medium associated with the processor 126 can be either internal or external to the processing unit of the processor without departing from the scope and spirit of the present invention. Further, in one embodiment, the processor 126 communicates with the plant computer 122 and/or the data storage unit 124 via a network connection.

The processor 126 should be broadly construed to mean any computer or component thereof that executes software. In one embodiment the processor 126 is a general purpose computer, in another embodiment, it is a specialized device for implementing the functions of the invention. Those skilled in the art will recognize that the processor 126 includes an input component, an output component, a storage component, and a processing component. The input component receives input from external devices, such as the plant computer 122 or the data storage unit 124 attached to the plant computer 122. The output component sends output to external devices, such as a printer, the plant computer 122, or another computer system or network. The storage component stores data and program code. In one embodiment, the storage component includes random access memory. In another embodiment, the storage component includes non-volatile memory, such as floppy disks, hard disks, and writeable optical disks. The processing component executes the instructions included in the software and routines.

Figure 2:
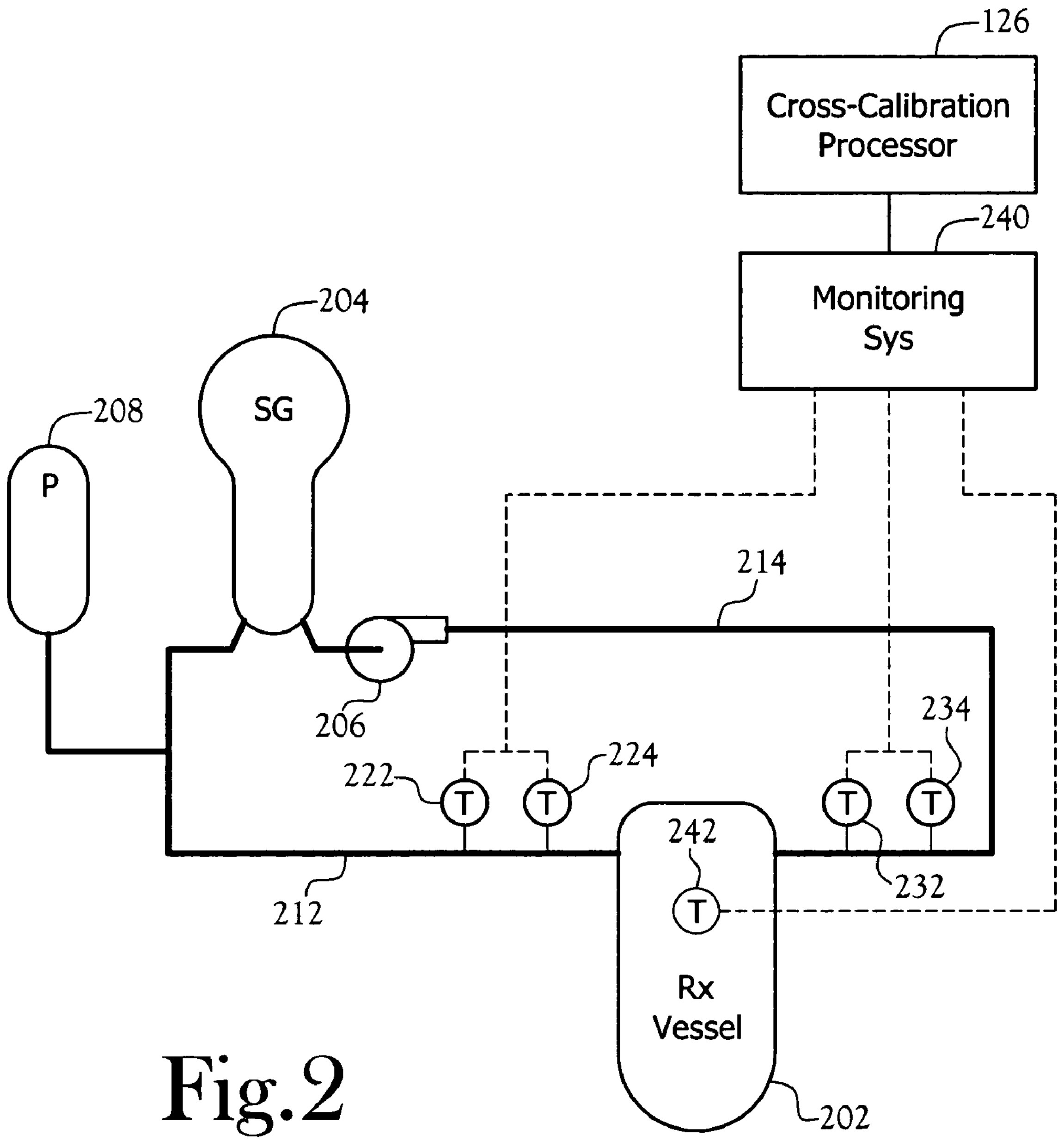
FIG. 2 is a piping and instrumentation diagram of a reactor loop with temperature instruments.

FIG. 2 illustrates a single loop of a reactor coolant system for a pressurized water reactor (PWR). The reactor (Rx) vessel 202 contains the nuclear core, which heats the water. The heated water exits the hot leg piping 212, which is routed to the steam generator (SG) 204, where the heat generated in the reactor vessel 202 is converted to steam for driving a turbine. The cooled water exits the steam generator 204 to a reactor coolant pump 206, which pumps the water through the cold leg piping 214 into the reactor vessel 202. The vessel 202 illustrated in FIG. 2 only shows, for clarity, one steam generator 204 in a closed fluid system or loop, however, it should be understood that the number of such loops and steam generators 204 varies from plant to plant and commonly two, three, or four are employed. Also shown in FIG. 1 is a pressurizer (P) 208, which serves to maintain the pressure in the reactor coolant system. The pressurizer 208 is typically found on only one loop of the reactor coolant system.

The hot and cold legs 212, 214 include temperature monitoring instruments (T) 222, 224, 232, 234, which are resistance temperature detectors (RTDs). Resistance temperature detectors are devices in which their resistance varies in relation to their temperature. Various means for analytically determining temperature from resistance of RTDs are known. One method is the quadratic equation:

$$R_T = R_0 \cdot \{1 + A \cdot T + B \cdot T^2\}$$

where: $R_T$=Resistance (ohms) at Temperature T (degrees Celsius (C.))

$R_0$=Sensor-specific constant (Resistance at t=0 degrees C.)

A=Sensor-specific constant

B=Sensor-specific constant

The quadratic equation is an approximation that is accurate over a certain temperature range. Another method of modeling an RTD is the Callendar equation:

$$R_T = R_0 \cdot \{1 + \alpha(1 + 0.01 \cdot \delta)T - \alpha \cdot \delta / 10^4 \cdot T^2\} \text{(for } T \geqq 0 \text{ degree C.)}$$

where: $R_T$=Resistance (ohms) at Temperature T (degrees Celsius)

$R_0$=Sensor-specific constant (Resistance at t=0 degrees C.)

α (alpha)=Sensor-specific constant

δ (delta)=Sensor-specific constant

The Callendar equation is an approximation that is accurate above zero degrees Celsius. Still another method of modeling an RTD is the Westinghouse Reference equation:

$$R_T = Ref(T) + \text{Offset} - \text{Slope} \cdot (T - 525)$$

where: $Ref(T) = R = 185.807 + 0.444693T - 0.000036082T^2$ degrees Fahrenheit

Offset=sensor specific constant

Slope=sensor specific constant

The Westinghouse Reference function applies a linear adjustment to a standard quadratic reference. This is used in some plant instrumentation to simplify the conversion between resistance and temperature.

The Callendar and quadratic equations are equivalent when performing a second order fit. The Westinghouse Reference is constrained in how well it can fit a specific RTD due to its reference function. The quadratic linear and Callendar linear produce the second order equations, but are generated with a linear (first order) fit to the difference between the calibration data and the previous calibration.

The exact values of the coefficients ($R_0$, α, δ, and β), ($R_0$, A, and B), and (offset and slope) are specific to each RTD device and are obtained by testing each individual sensor at various temperatures.

The hot leg 212 includes at least one wide range temperature sensor 222 that is calibrated to measure the temperature of the reactor coolant in the hot leg 212 from startup to operating to shutdown. The hot leg 212 also includes at least one narrow range temperature sensor 224 that is calibrated to measure the temperature of the reactor coolant in the hot leg 212 under operating conditions. The narrow range temperature sensor 224 is used to control and monitor the reactor during operation, accordingly, it is common to have redundant sensors 224 for each hot leg 212. It is known to have up to three dual element RTDs for each hot leg 212. For example, three of the RTD elements are in service with three elements in reserve as spares.

The cold leg 214 includes at least one wide range temperature sensor 232 that is calibrated to measure the temperature of the reactor coolant in the cold leg 214 from startup to operating to shutdown. The cold leg 214 also includes at least one narrow range temperature sensor 234 that is calibrated to measure the temperature of the reactor coolant in the cold leg 214 under operating conditions. As with the hot leg 212 narrow range sensors 224, there are redundant cold leg 214 narrow range sensors 234. It is known to have two narrow range sensors 234 for each cold leg 214.

Core-exit thermocouples (CETs) 242 are inside the reactor vessel 202 and above selected fuel bundles. The CETs 242 are grouped into quadrants, that is, quarter-sections of the circular cross-section of the reactor core. Thermocouples are based on the effect that the junction between two different metals produces a voltage which increases with temperature. Thermocouples typically have a measurement junction and a reference junction, and they measure the temperature difference between the two junctions.

The hot leg temperature sensors 222, 224, the cold leg temperature sensors 232, 234, and the core-exit thermocouples 242 communicate with the plant monitoring system 240. The plant monitoring system 240 provides indication and data acquisition of instrumentation, thereby monitoring the condition of plant processes. The plant monitoring system 240 includes the plant computer 122 and the data storage unit 124, in addition to other associated equipment, such as isolators. In the embodiment illustrated in FIG. 2, the cross calibration processor 126 is in communication with the plant monitoring system 240. In one embodiment, the processor 126 communicates with the plant monitoring system 240 via a network connection.

In a typical reactor coolant system, the temperatures measured by each of the sensors 222, 224, 232, 234, 242 fall within a narrow range at any point in time. For example, the hot leg 212 temperature during operation should be slightly hotter than the temperature of the cold leg 214. The difference in temperature is related to the temperature drop across the steam generator 204. At some plants, this temperature variation may be approximately 50 degrees Celsius with the cold leg temperature being approximately 550 degrees Celsius. Further, the temperature measured by the redundant instruments 222, 224, 232, 234, 242 typically fall within an even narrower range.

In one embodiment, the temperature data collected by the plant computer 122 includes process data produced during isothermal conditions. That is, in a pressurized nuclear plant, the primary coolant system is brought up to temperature by the heating produced by the reactor coolant pumps 206 without relying upon the reactor to produce heat. In isothermal conditions, the temperature varies throughout the system only from heat loss from the system components, and this variation is less than the temperature variation throughout the system with the reactor in operation. In this embodiment, under isothermal conditions, the hot leg temperature sensors 222, 224, the cold leg temperature sensors 232, 234, and the core-exit thermocouples 242 all measure the reactor coolant fluid temperature with similar or related readings. In another embodiment, the data collected by the plant computer 122 includes process data produced during plant conditions in which the instruments 104 being cross-calibrated are operating under equilibrium, that is, the subject instruments 104 are responding to a measured parameter that is substantially identical or related for all instruments 104.

In another embodiment, the process variable being measured is not temperature, but some other process variable, for example, pressure or radiation. In still another embodiment, the instruments 104 are not necessarily redundant instruments, but are instruments 104 that produce similar or related readings under controlled conditions.

Figure 3:
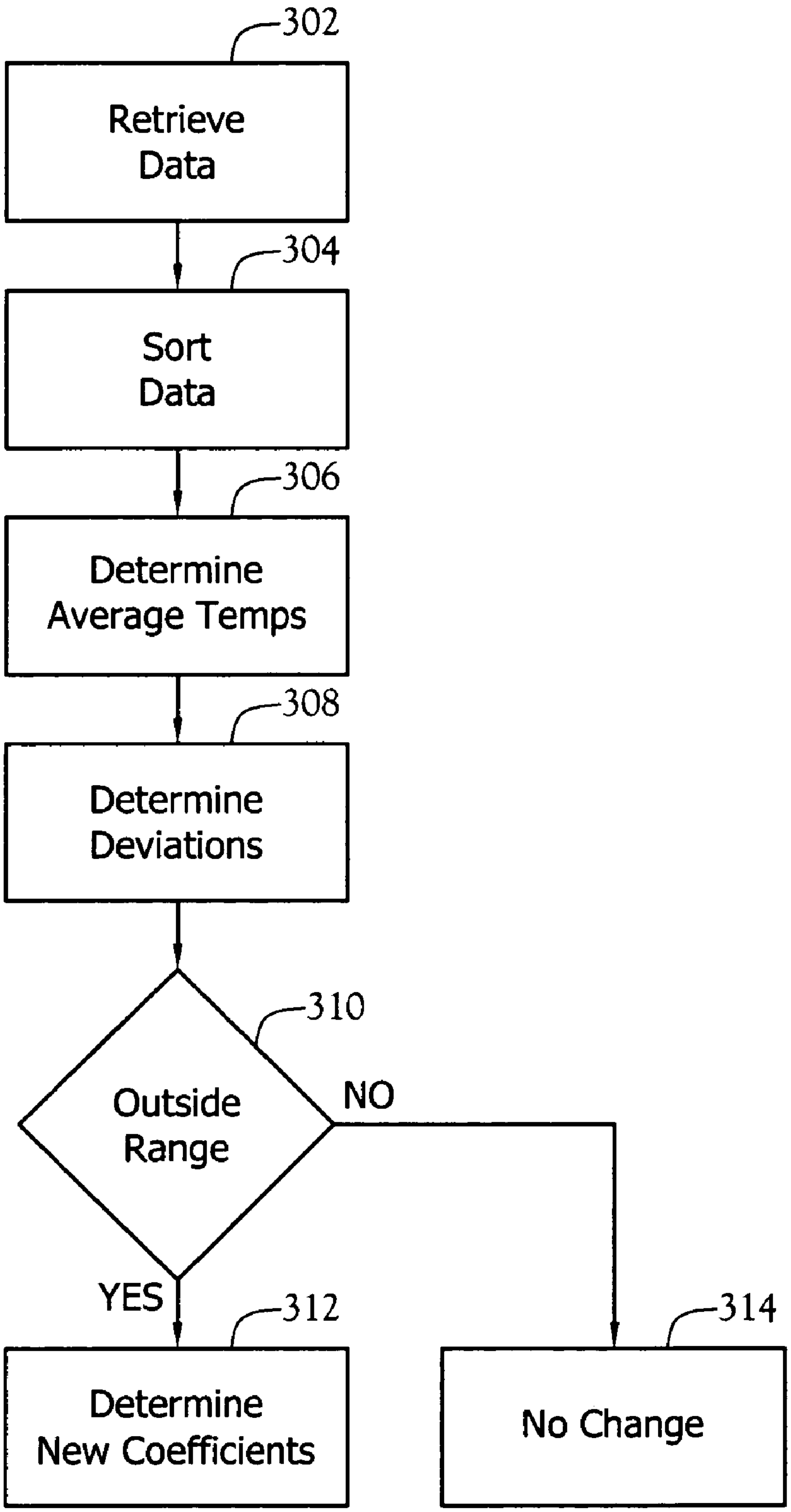
FIG. 3 is a block diagram of one embodiment of the present invention.

FIG. 3 illustrates a simplified block diagram of one embodiment of the present invention. The first step is to retrieve data 302 from the plant monitoring system 240. Once retrieved, the data is sorted 304 to allow for easier processing. The next step is to determine the average temperatures 306 of the various temperature instruments. After the average temperatures are known, the next step is to determine the deviations 308 of each of the instruments from the averages. For deviations outside a range 310, the next step is to determine new coefficients, or calibration curves, 312. For those instruments with no deviations outside the range, there is no change 314.

Figure 4:
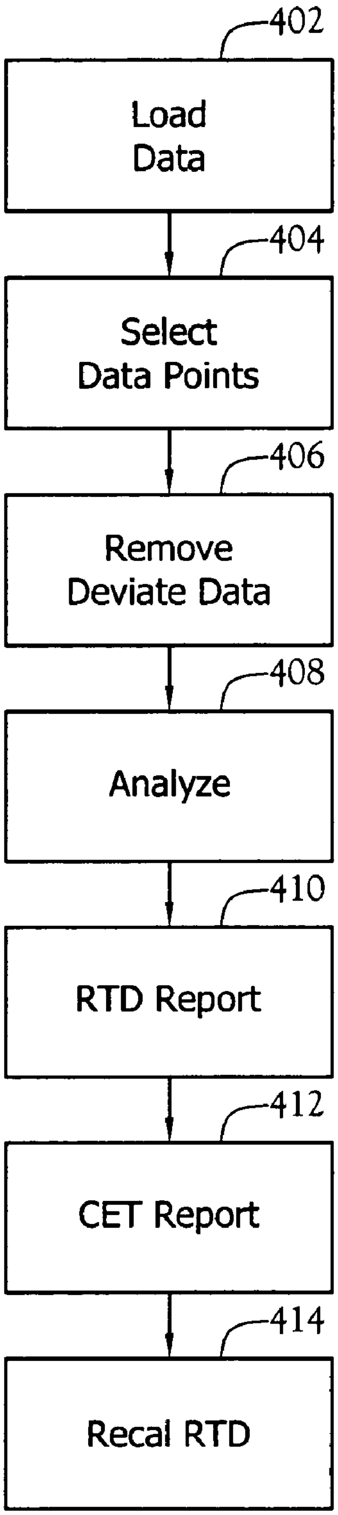
FIG. 4 is a block diagram of one embodiment of the software for the present invention.

FIG. 4 illustrates a block diagram of another embodiment of the software executed by the cross calibration processor 126. Each software function identified is further broken down in another figure, providing a greater and greater level of detail for the various functions performed by the cross calibration processor 126.

Figure 5:
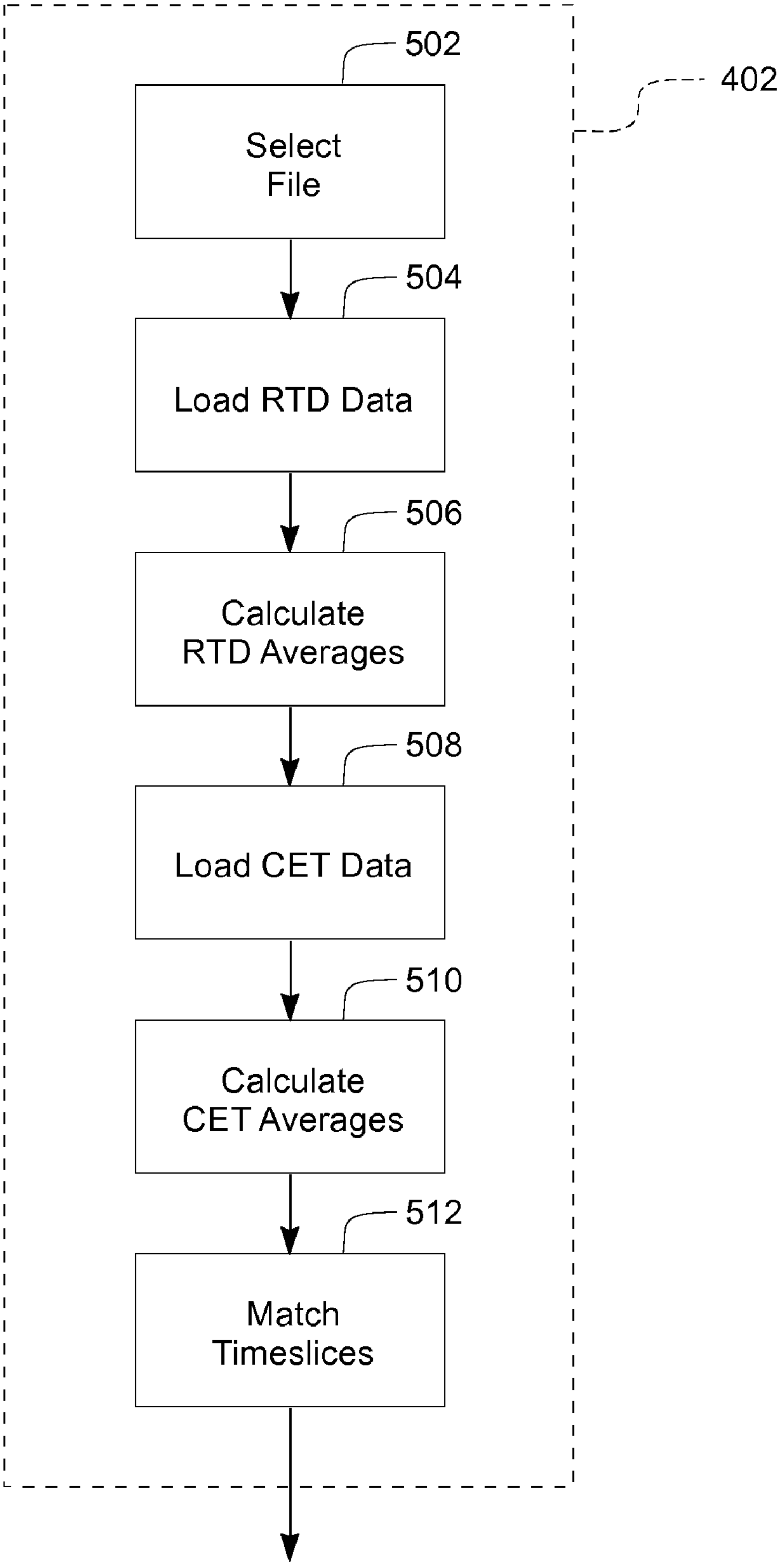
FIG. 5 is a block diagram of one embodiment of the load data routine.
Figure 12:
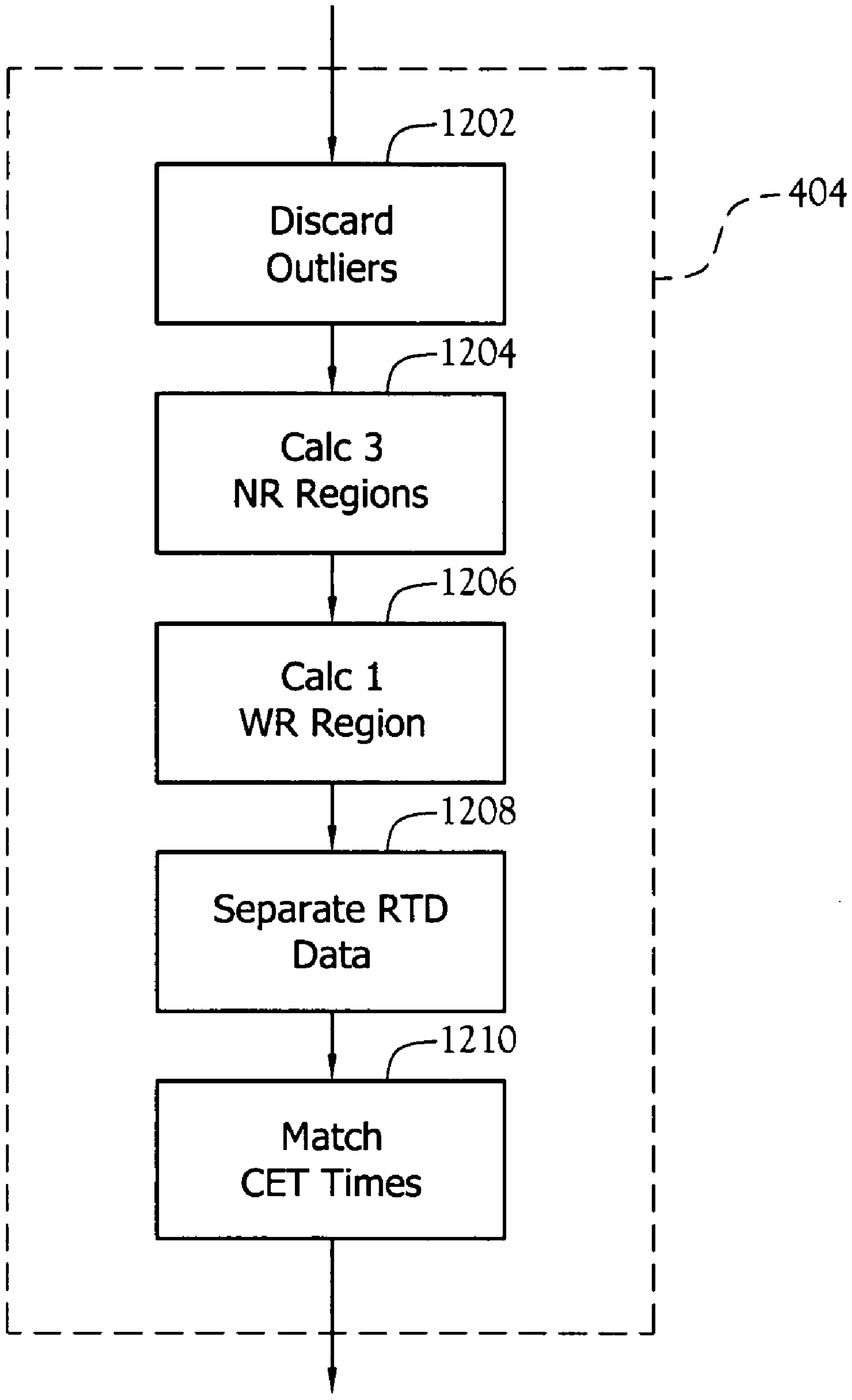
FIG. 12 is a block diagram of one embodiment of the select routine.
Figure 15:
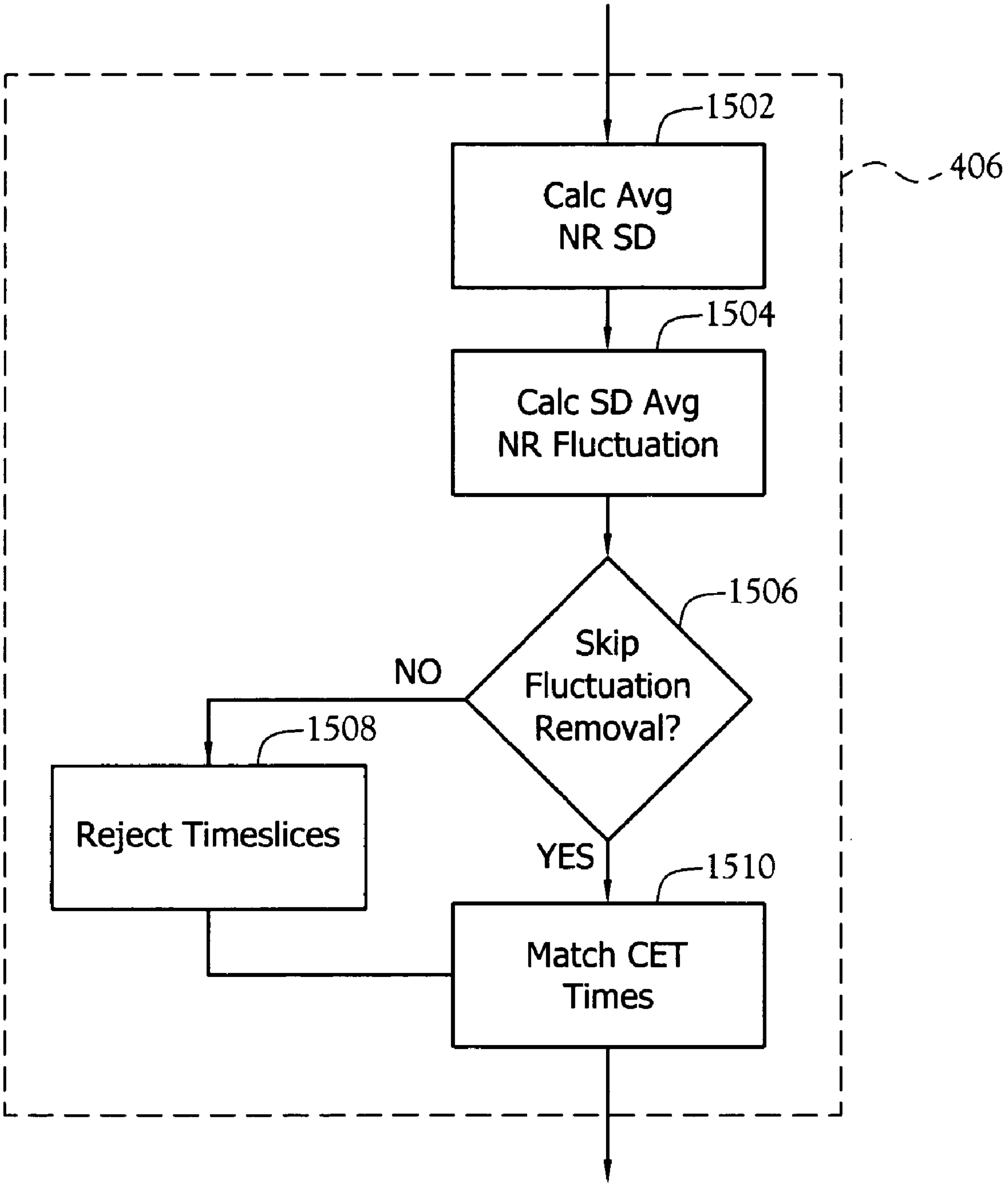
FIG. 15 is a block diagram of one embodiment of the fluctuation removal routine.
Figure 16:
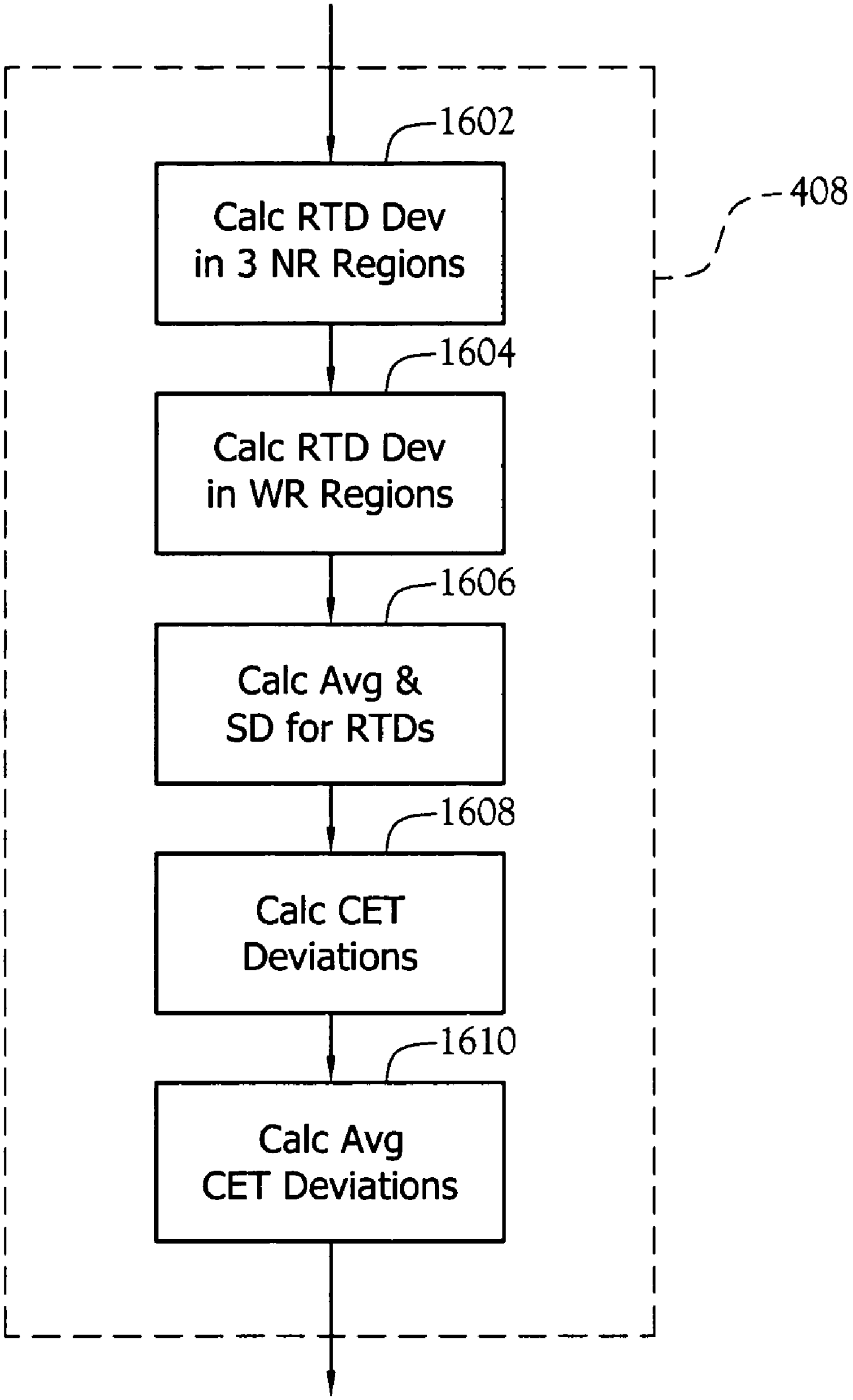
FIG. 16 is a block diagram of one embodiment of the analyze routine.
Figure 22:
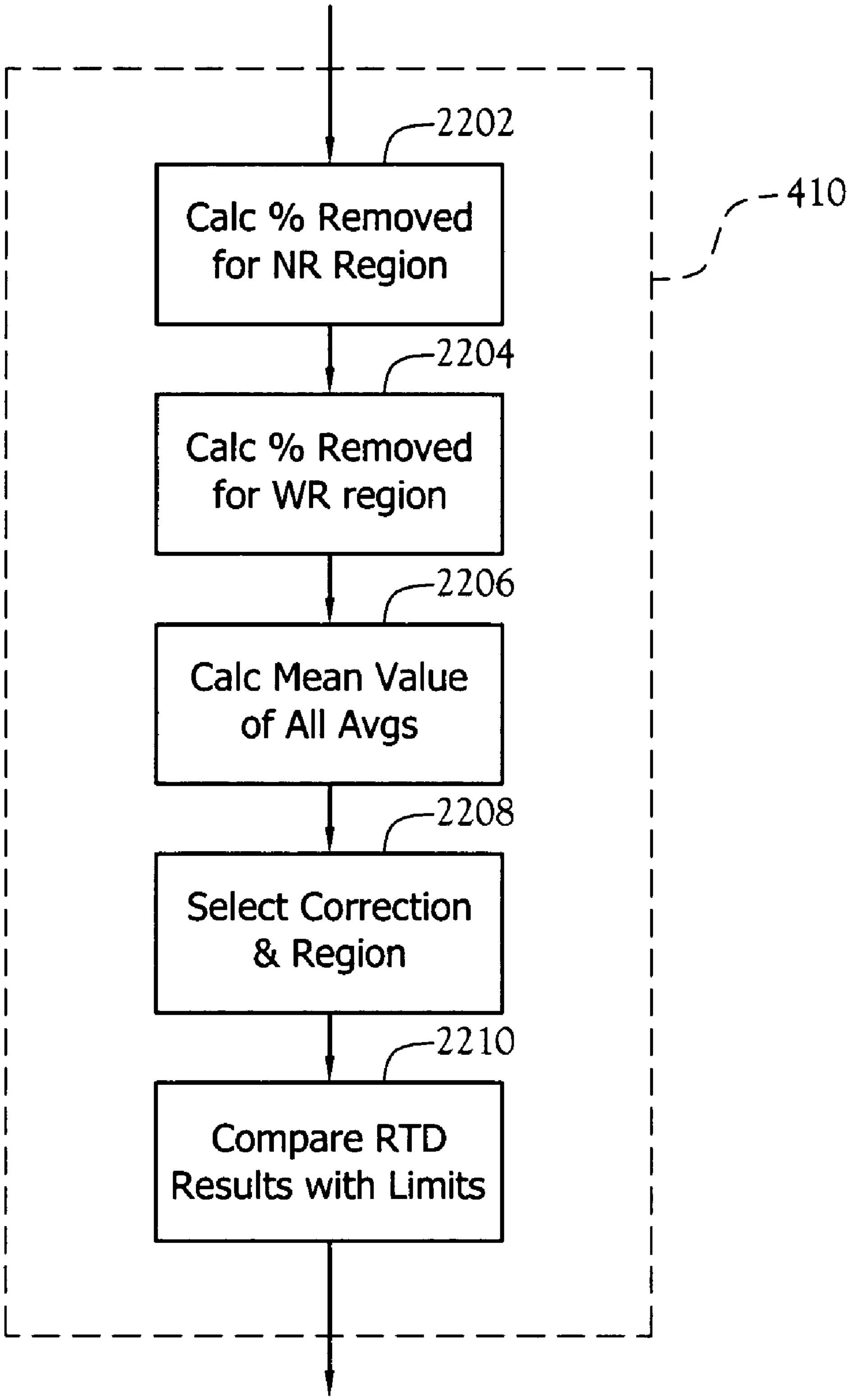
FIG. 22 is a block diagram of one embodiment of the RTD report routine.
Figure 26:
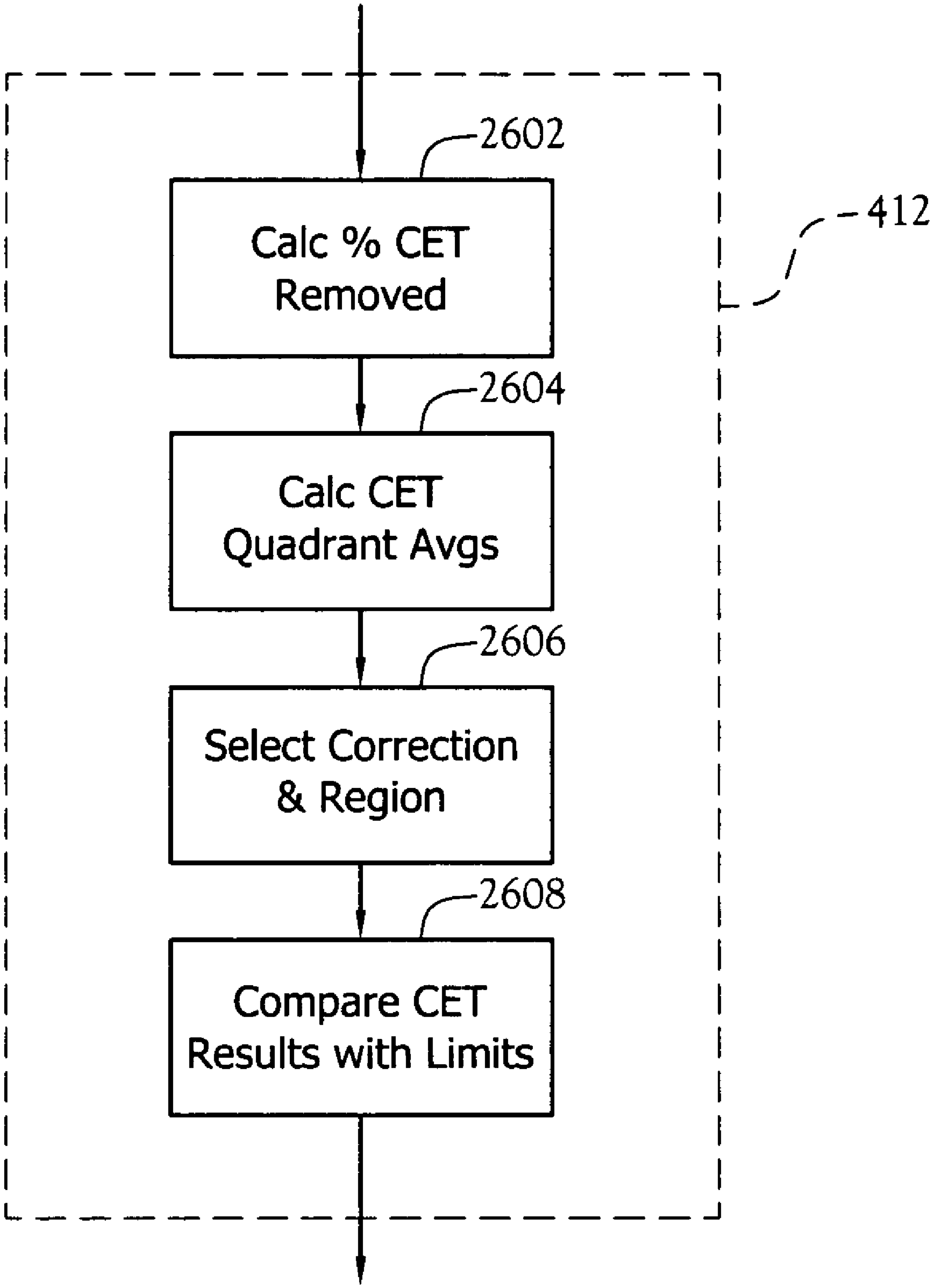
FIG. 26 is a block diagram of one embodiment of the CET report routine.
Figure 28:
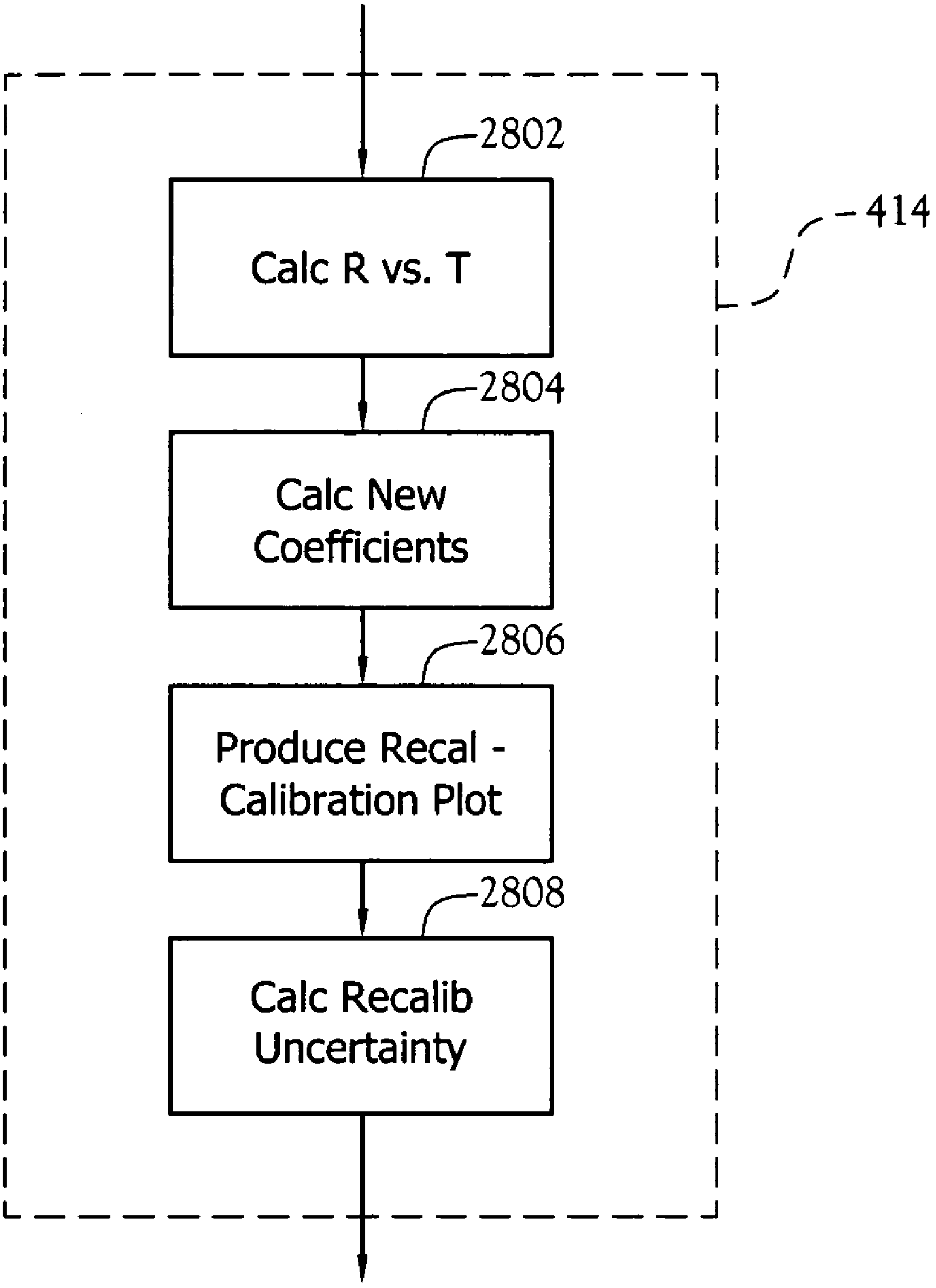
FIG. 28 is a block diagram of one embodiment of the recalibrate for selected recalibration RTD routine.

The first function illustrated in FIG. 4 is to load, or retrieve, the data 402. FIG. 5 illustrates a detailed block diagram of the functional steps for loading the data 402. After the data is loaded 402, the next step is to select the data points 404. FIG. 12 illustrates a block diagram of the functional steps for selecting the data points 404. After the data points are selected 404, the next step is fluctuation removal, or to remove deviate data, 406. FIG. 15 illustrates a block diagram of the functional steps for removing deviate data 406. After the deviate data is removed 406, the next step is to analyze the data 408. FIG. 16 illustrates a block diagram of the functional steps for analyzing the data 408. After the analysis 408, the next step is the RTD report 410 and the CET report 412. FIG. 22 illustrates a block diagram of the functional steps for generating the RTD report 410. FIG. 26 illustrates a block diagram of the functional steps for generating the CET report 412. The final step is to recalibrate any deviating or outlying RTDs 414. FIG. 28 illustrates a block diagram of the functional steps for recalibrating any deviating RTDs 414. As used in herein, a report includes providing data to a user, whether printed or displayed, whether in visual format or digital format.

The software executed by the cross calibration processor 126 includes user interface routines and configuration setup routines. The configuration routines include storing values for the maximum and minimum temperature range settings for acceptable process estimates from the RTDs; the size in temperature of the partitions used to calculate deviations, the deviation limits between RTDs and CETs used in rejecting measurements from the average, the Standard Deviation limit multiplier used in process fluctuation removal, and the information regarding the sensors used in the software. Sensor information includes sensor name, narrow or wide range designation, hot or cold loop designation, use in the average, coefficients for conversion from resistance or voltage to temperature, uncertainty values for each sensor, core location, quadrant, and other data. The configuration values identified above are used in the various routines described below. The user interface routing, in various embodiments, allows the operator to load, save, print, and/or modify the configuration settings.

The following table illustrates the configuration values stored for one embodiment:

| | |
|---|---|
| Software Variables: | |
| NR Min | Narrow Range minimum value |
| NR Max | Narrow Range maximum value |
| NR Region Size | Narrow Range size in temperature of the partition to calculate deviations |
| WR Min | Wide Range minimum value |
| WR Max | Wide Range maximum value |
| WR Region Size | Wide Range size in temperature of the partition to calculate deviations |
| SDEV Limit | Standard Deviation limit multiplier |
| Sensor Information: | |
| Sensor ID | Name or identifier of sensor |
| Sensor Type | Type of sensor, e.g., RTD or CET |
| Sensor designation | Narrow or wide range, cold or hot leg |
| Sensor Conversion Factor | Conversion factor to convert sensor info to process units |
| Sensor Uncertainty | Uncertainty value for the particular sensor |

The user interface, in various embodiments, includes a load and select screen associated with loading the data 402 and selecting the data points 404, an RTD fluctuation removal screen associated with fluctuation removal 406, an analysis screen associated with analyzing the data 408, an RTD report screen associated with the RTD report 410, a CET report screen associated with the CET report 412, an RTD recalibration screen associated with recalibrating any deviating RTDs 414, and/or an RTD recalibration uncertainty screen associated with recalibrating any deviating RTDs 414.

The load and select screen associated with loading the data 402 and selecting the data points 404 allows for loading data from multiple files with RTD and/or CET data or directly from the plant computer database. It also allows for displaying and printing all average types from the loaded data. Further, it allows for selecting the data to be analyzed by bounding the desired data with graph cursors and separating the data into regions based on the maximum and minimum temperature range settings from the configuration data. The load and select screen allows for displaying and printing the deviations of each average type for all of the loaded data or for data separated into regions.

The RTD fluctuation removal screen associated with fluctuation removal 406, in various embodiments, allows for displaying and printing the standard deviation of the process estimate average with and without the standard deviation fluctuation removed for each region of the data. The screen also allows for displaying and printing information including the initial number of samples, final number of samples after standard deviation fluctuation removal, percent of initial data used, standard deviation multiplier, average standard deviation, standard deviation of the average standard deviation, high fluctuation removal limit, low fluctuation removal limit.

The analysis screen associated with analyzing the data 408, in various embodiments, allows for displaying and printing, for a selected region, each average type and the deviations from the process estimate for all RTDs and CETs. The analysis screen also allows for displaying and printing, for a selected narrow range region, the deviations from the process average with corrections applied. Also, the screen allows for displaying and printing deviations by sensor group or individually by tag or ID number.

The RTD report screen associated with the RTD report 410, in various embodiments, allows for displaying, loading, saving, and printing RTD cross calibration results information for each region and correction type. The screen also allows the option to save all RTD cross calibration results as a text file.

The CET report screen associated with the CET report 412, in various embodiments, allows for displaying, loading, saving, and printing cross calibration results information for each region and average type. The screen also allows the option to save all RTD cross calibration results as a text file.

The RTD recalibration screen associated with recalibrating any deviating RTDs 414, in various embodiments, allows for displaying and printing recalibration information for the selected RTD and calibration type. Calibration types include Callendar, Callendar Linear, Westinghouse Reference, Quadratic, and Quadratic Linear. Recalibration information includes temperature per region, measured average resistance per region, RSS uncertainties per region, original calibration constants/coefficients, and new calibration constants/coefficients. The recalibration screen allows for displaying and printing a graph of new calibration points—original calibration points vs. temperature and a calibration table for a selected RTD. The screen also allows the option to save calibration information to a text file.

The RTD recalibration uncertainty screen associated with recalibrating any deviating RTDs 414, in various embodiments, allows for displaying and printing the uncertainty curves for the new calibration points.

Figure 6:
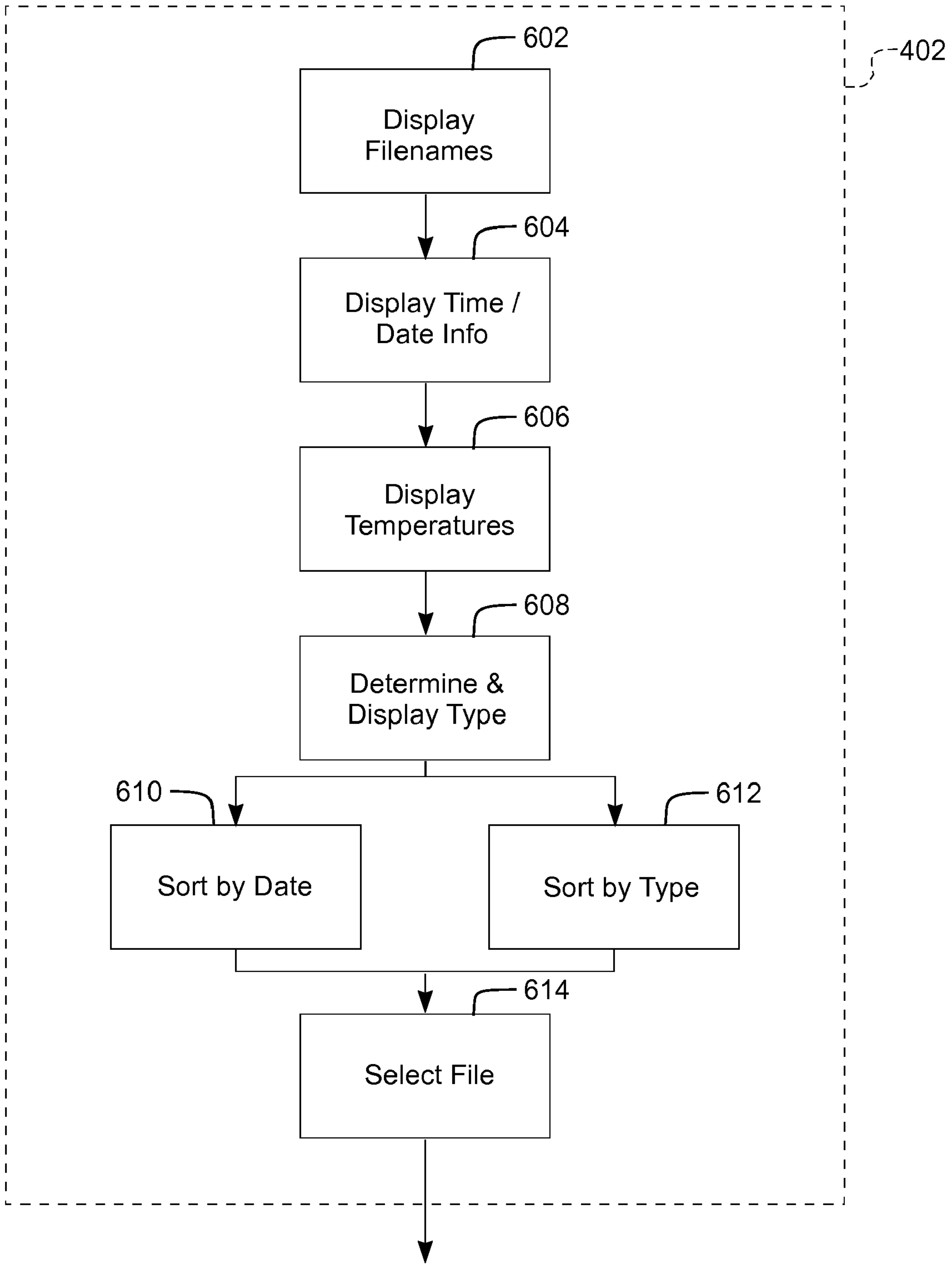
FIG. 6 is a block diagram of one embodiment of the file selection routine.
Figure 7:
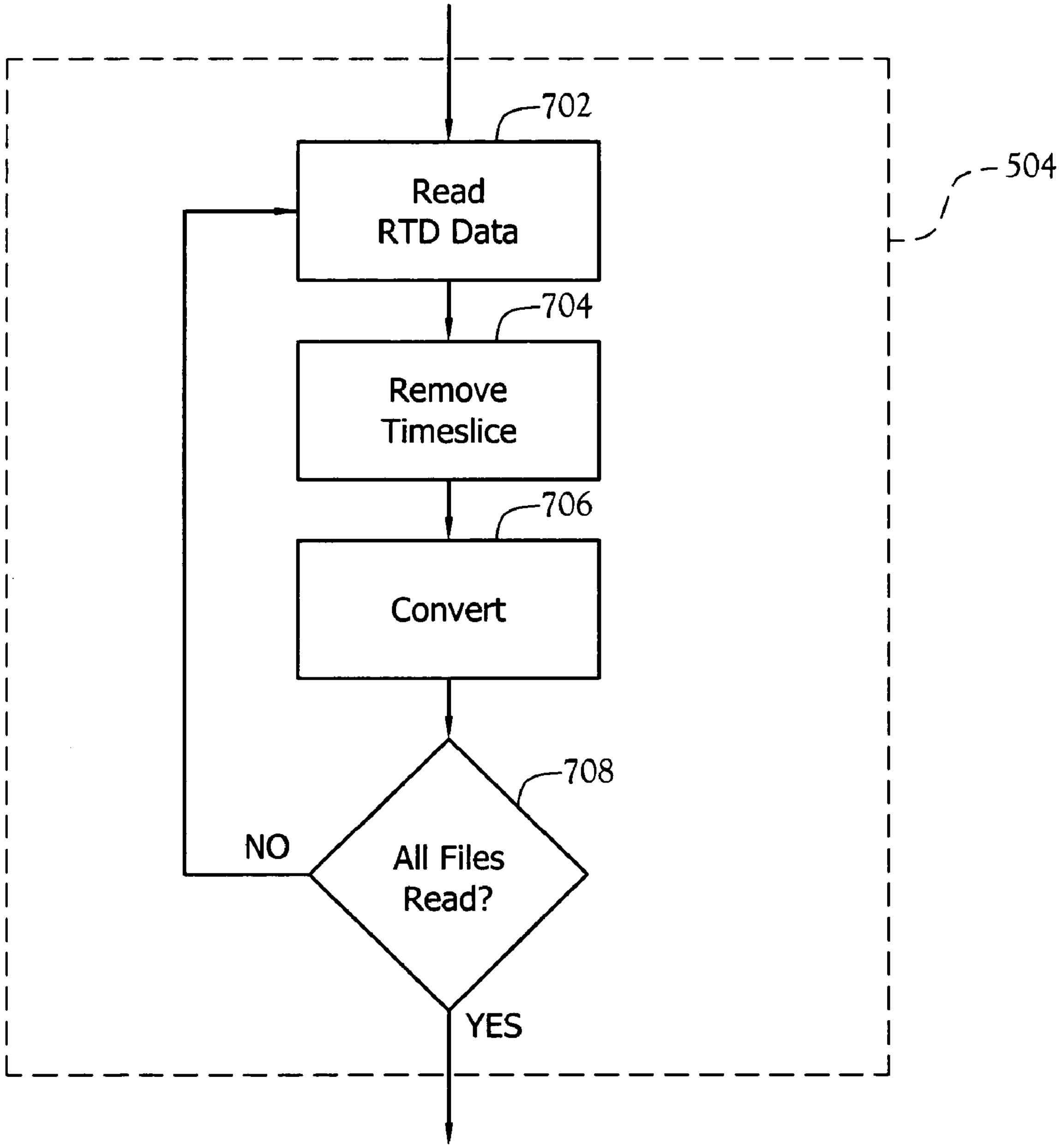
FIG. 7 is a block diagram of one embodiment of the load RTD data routine.
Figure 8:
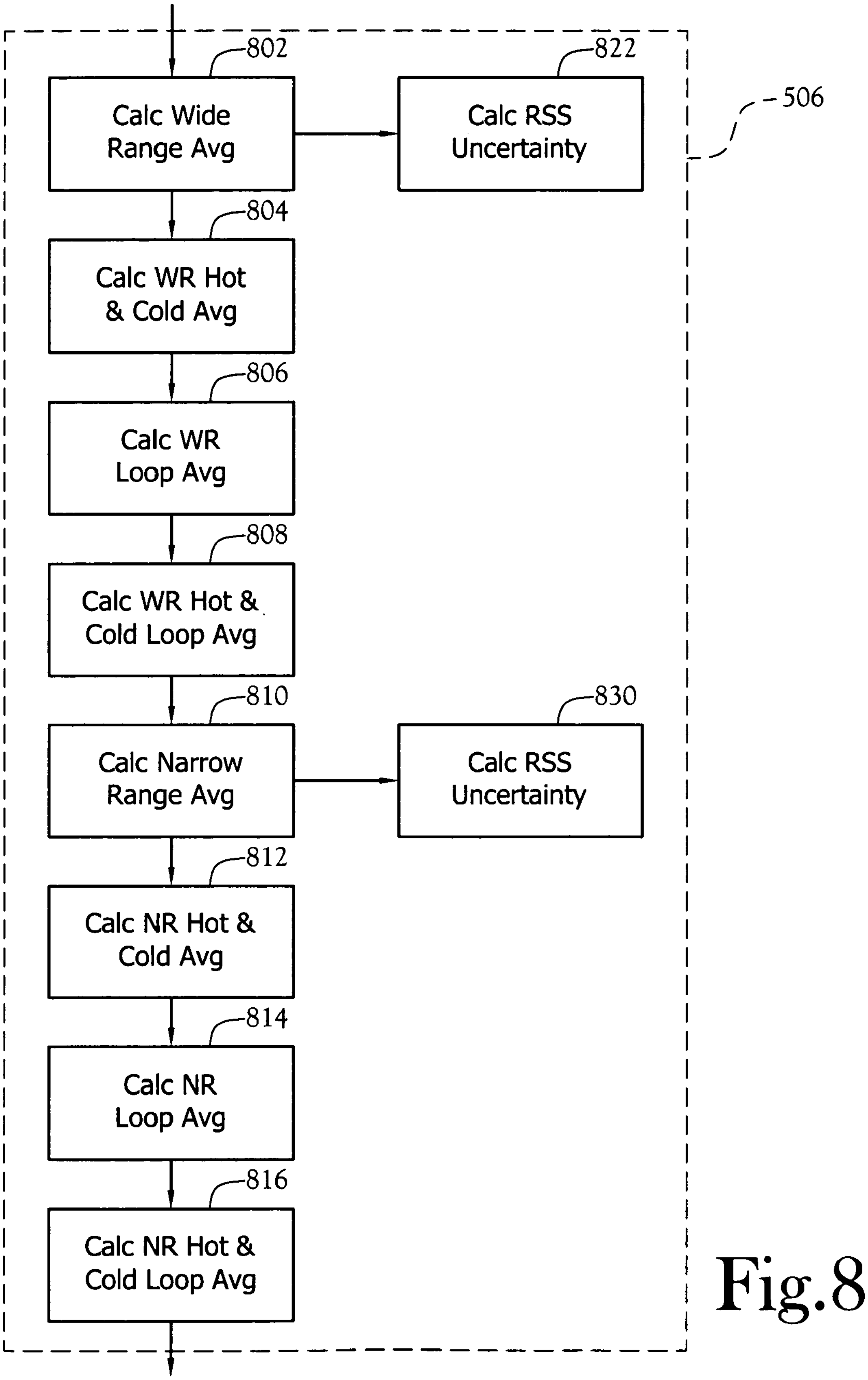
FIG. 8 is a block diagram of one embodiment of the calculate RTD averages routine.
Figure 9:
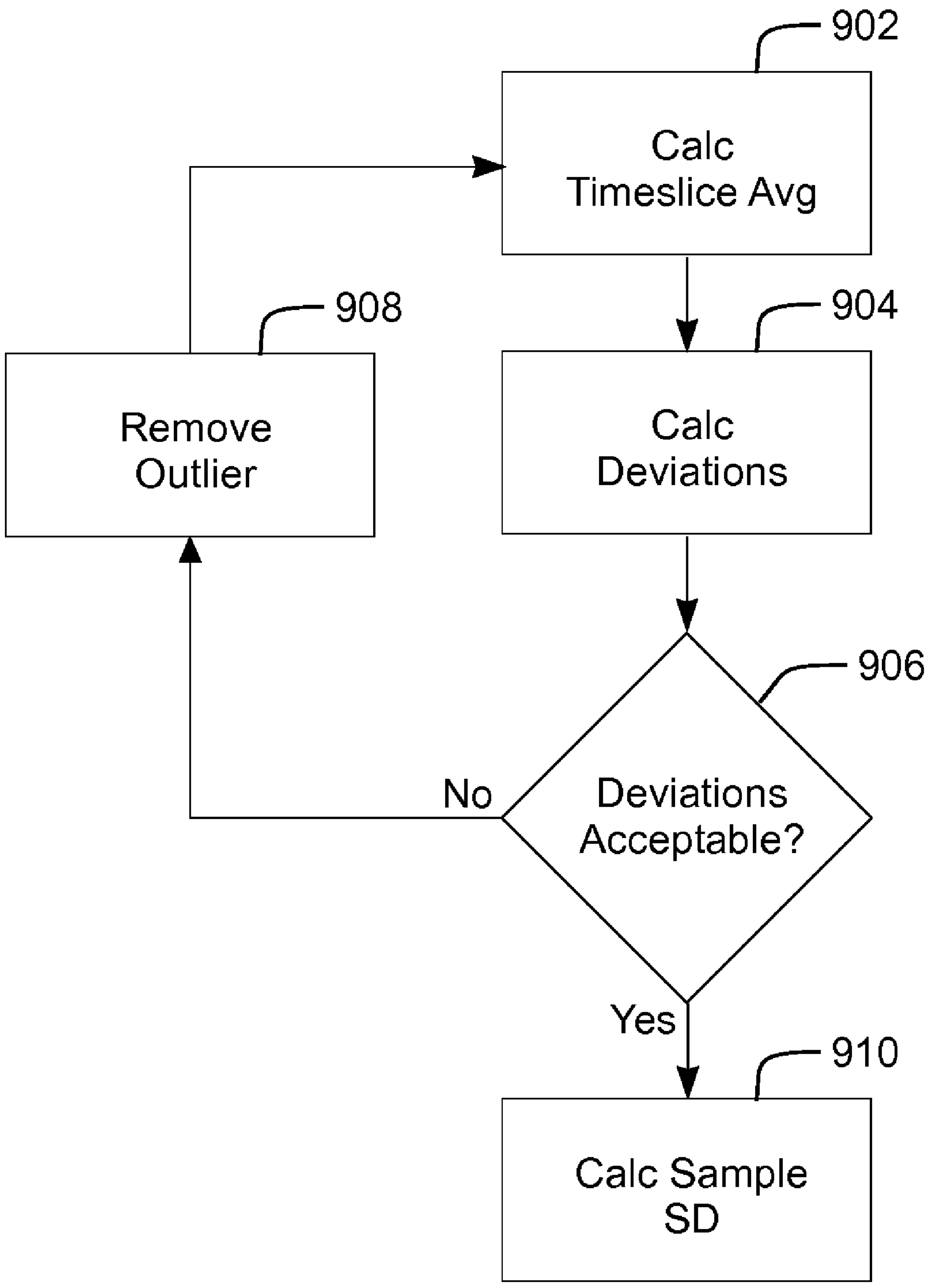
FIG. 9 is a block diagram of one embodiment of the calculate averages routine.
Figure 10:
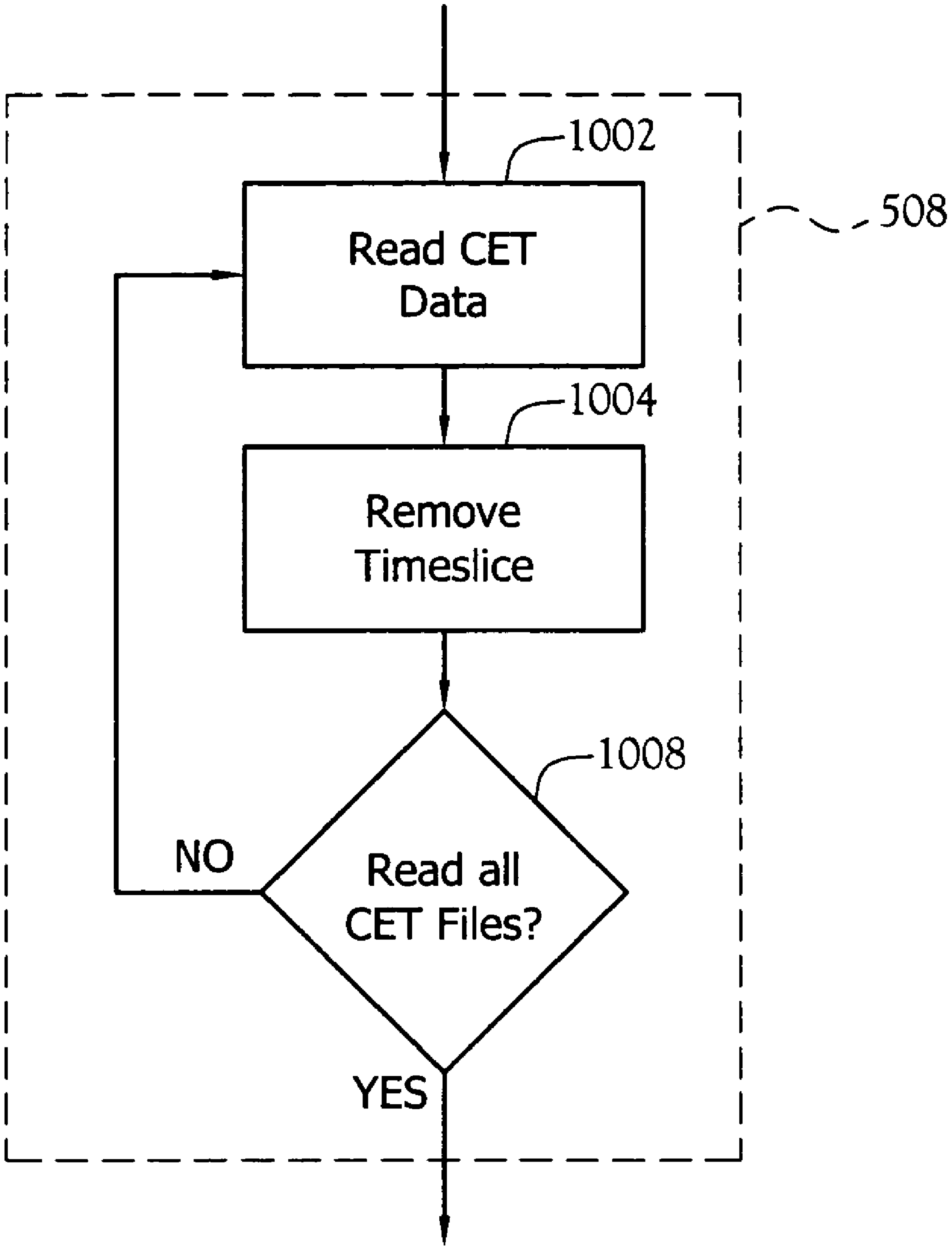
FIG. 10 is a block diagram of one embodiment of the load CET data routine.
Figure 11:
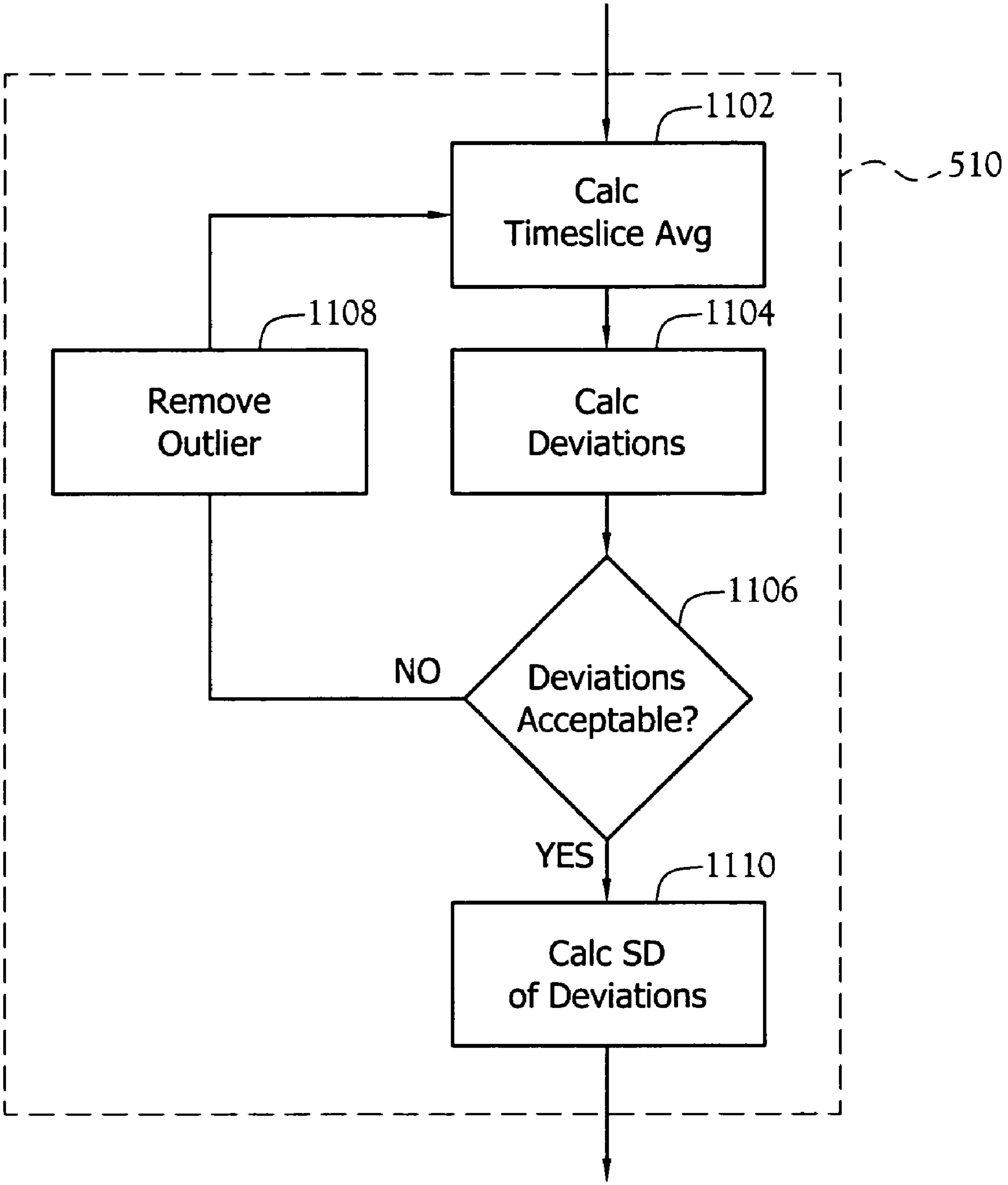
FIG. 11 is a block diagram of one embodiment of the calculate CET averages routine.

FIG. 5 illustrates a detailed block diagram of one embodiment of the functional steps for loading the data 402. In the illustrated embodiment, the first step is to select the file 502. FIG. 6 illustrates a detailed block diagram of the functional steps for selecting the file 502. The next step after selecting the file 502 is to load the RTD data 504. FIG. 7 illustrates a detailed block diagram of the functional steps for loading the RTD data 504. The next step after loading the RTD data 504 is to calculate the RTD averages 506. FIG. 8 illustrates a detailed block diagram of the functional steps for calculating the RTD averages 506 for each timeslice. FIG. 9 illustrates a detailed block diagram of the functional steps for the routine for calculating each average as shown on FIG. 8. The next step after calculating the RTD averages 506 is to load the CET data 508. FIG. 10 illustrates a detailed block diagram of the functional steps for loading the CET data 508. The next step after loading the CET data 508 is to calculate the CET averages 510. FIG. 11 illustrates a detailed block diagram of the functional steps for calculating the CET averages 510. The next step after calculating the CET averages 510 is to match the timeslices 512 for the RTD and CET data. Some plants store the CET data at a slower rate than the RTD data, i.e. CET 10 seconds and RTD 1 second. In order to compare the CET data with the RTD data, the timeslices (samples) that have the same sample time for the RTD and CET data are selected (matched). The unmatched data is not used for the CET and RTD comparison. In a broad sense, a timeslice is a time period in which the data samples are considered to be taken practically simultaneous.

In another embodiment, the step of loading the data 402 includes an option for manually entering instrument data. For example, instead of selecting the file 502, loading the RTD data 504 and/or loading the CET data 508, an input screen is provided for the operator to manually input data for specific instruments. Thus, instrument data for a temperature range not recorded by the plant computer 122 can be used for the cross calibration. In still another embodiment, the step for selecting the file 502 includes reading a file containing data from a source other than the plant computer 122.

FIG. 6 illustrates a detailed block diagram of one embodiment of the functional steps for selecting the file 502. The first step is to display the files 602, which, in one embodiment, includes displaying a list of the files in a selected location relating to a specific instrument. Each file includes data relating to information such as sensor names, units, description, date and time of each sample, and sensor measurements. The next step, displaying time and date information 604, includes displaying the first and last date and time for the data in each file. The next step, display temperatures 606, includes displaying the temperature range of the data in each file. The next step, determine and display type 608, includes determining whether the data in each file is from an RTD, CET, or both, and then displaying that information. In one embodiment, the above steps 602, 604, 606, 608 occur in any order to display multiple pieces of information relating to each file. In another embodiment, only one of the above steps 602, 604, 606, 608 occur, with the operator selecting which information to display on a console screen.

After the information is displayed, the next steps allow for sorting by date 610, which includes sorting the previously displayed data in order by date, or sorting by type 612, which includes sorting the previously displayed data in order by the previously determined type 608. After the data is presented to the operator, the operator selects one or more files 614 containing the data to be processed.

In the illustrated embodiment, the operator is presented with information with which the operator can make the decision as to which data is to be used for processing. In other embodiments, the operator is presented with information that results in the proper files being selected for processing. In various embodiments, this information includes one or more of the information displayed in steps 602, 604, 606, 608 and/or includes other information.

FIG. 7 illustrates a detailed block diagram of one embodiment of the functional steps for loading the RTD data 504. The first step is to read the RTD data 702 from the RTD file. The second step, remove timeslice 704, includes removing any timeslice data if the any of the data in the timeslice is not numeric or is less than some specified value. In one embodiment, the specified value is 0.1. After any suspect data is removed 704, the next step is to convert the data 706. In one embodiment, the data is converted from an instrumentation value to a process value. For example, a voltage reading from a transmitter is converted to the process temperature value, such as degrees Celsius. After any conversion 706, the next step is to determine if all files have been read 708. If not, the routine cycles back to the step of reading the RTD data 702. If all the data files have been read 708 and processed, the routine exits to the next step of calculating the RTD averages 506.

FIG. 8 illustrates a detailed block diagram of one embodiment of the functional steps for calculating the RTD averages 506 for each timeslice. FIG. 8 illustrates the various steps for calculating the RTD averages 506 as sequential steps. In other embodiments, the steps are performed in different sequences or simultaneously.

The first illustrated step, calculate wide range (WR) average 802 is associated with the step of calculating RSS uncertainty 822 for the WR RTDs. The step of calculating the RSS uncertainty 822 includes calculating the uncertainty using a root sum square (RSS) methodology. Calculating the RTD averages 506 further includes calculating the WR hot and cold leg averages 804, calculating the WR loop average 806, calculating the WR hot and cold loop average 808, calculating the narrow range (NR) average 810, calculating the NR hot and cold leg average 812, calculating the NR loop average 814, and calculating the NR hot and cold loop average 816. Associated with calculating the NR average 810 is calculating the RSS uncertainty 830 for the NR RTDs.

Since the measurement uncertainties are provided for each sensor, the uncertainty for each average temperature is calculated as: $\mu_t = \sqrt{\Sigma \mu_i^2}/n$ $\mu_i$=each sensor measurement's uncertainty n=number of sensors in the average $\mu_t$=average temperature uncertainty for one sample FIG. 9 illustrates a detailed block diagram of one embodiment of the functional steps for the routine for calculating each average for the steps 802, 804, 806, 808, 810, 812, 814, 816 shown on FIG. 8. For each step 802, 804, 806, 808, 810, 812, 814, 816, the timeslice average of all process values for the associated RTDs is calculated 902. The next step is to calculate the deviations 904, which includes calculating the deviation from the average for each RTD used in the average calculation. The next step is to evaluate the deviations to determine if all the RTDs are to be used 906. This evaluation includes examining each deviation determined in step 904 and if any RTD has a deviation that is not above a specified low criteria and below a specified high criteria, that RTD is removed as an outlier 908 and the timeslice average is calculated 902 again without considering that RTD. If after calculating the deviations 904, all the RTD deviations fall within limits, the next step is to calculate the sample standard deviation (SD) 910. The standard deviation for all the RTDs used to calculate the average 902 is determined for each timeslice.

FIG. 10 illustrates a detailed block diagram of one embodiment of the functional steps for loading the CET data 508. The first step is to read the CET data 1002 from the CET file. The second step, remove timeslice 1004, includes removing any timeslice data if the any of the data in the timeslice is not numeric or is less than some specified value. In one embodiment, the specified value is 0.1. After any suspect data is removed 1004, the next step is to determine if all CET files have been read 1008. If not, the routine cycles back to the step of reading the CET data 1002. If all the data files have been read 1008 and processed, the routine exits to the next step of calculating the CET averages 510. In another embodiment, the CET data is converted to process units. For example, a voltage reading from a transmitter is converted to the process temperature value, such as degrees Celsius. This conversion step, in one embodiment, occurs after removing suspect timeslice data 1004.

FIG. 11 illustrates a detailed block diagram of one embodiment of the functional steps for calculating the CET averages 510. The first step is to calculate an average for the timeslice 1102 for all the associated CETs. The next step is to calculate the deviations 1104, which includes calculating the deviation from the average for each CET used in the average calculation. The next step is to evaluate the deviations to determine if all the CETs are to be used 1106. This evaluation includes examining each deviation determined in step 1104 and if any CET has a deviation that is not above a specified low criteria and below a specified high criteria, that CET is removed as an outlier 1108 and the timeslice average is calculated 1102 again without considering that CET. If after calculating the deviations 1104, all the CET deviations fall within limits, the next step is to calculate the standard deviation (SD) of the deviations 1110. The standard deviation of the deviations for all the CETs used to calculate the average 1102 is determined for each timeslice.

FIG. 12 illustrates a block diagram of one embodiment of the functional steps for selecting the data points 404. The first step is to discard any outliers 1202, that is, any data outside the start and end cursors. The selection 404 routine includes, in one embodiment, a user interface that displays the data obtained during the load data 402 step and allows the operator to select the data to be analyzed by bounding the desired data with graph cursors. In other embodiments, the selection 404 allows the operator to display and/or print the intermediate results obtained during the load data 402 routine.

Figure 13:
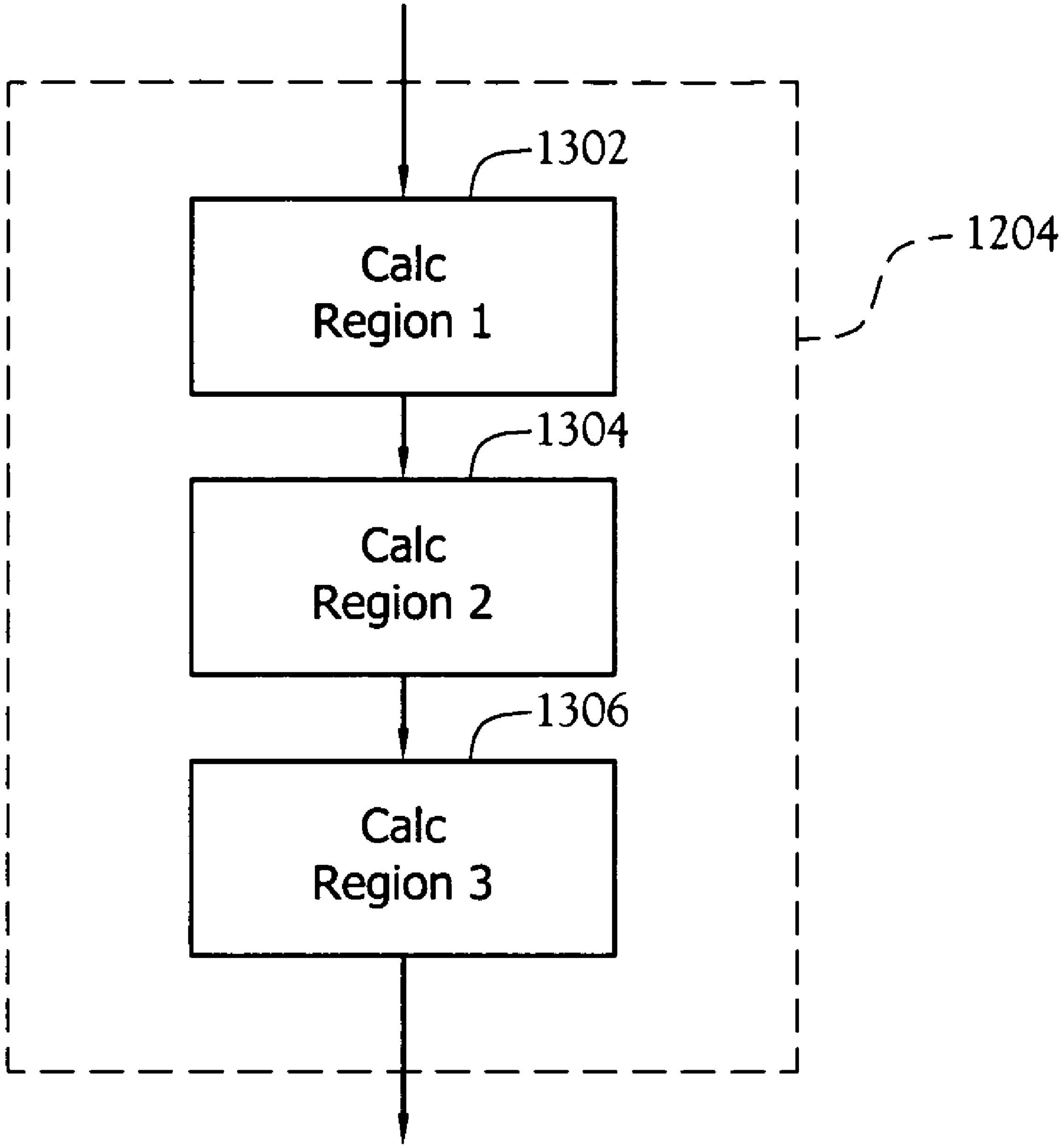
FIG. 13 is a block diagram of one embodiment of the calculate three narrow range regions routine.

The second step illustrated in FIG. 12 is to calculate the three NR regions 1204. FIG. 13 illustrates a block diagram of one embodiment of the functional steps for calculating the three NR regions 1204. The next step is to calculate one WR region 1206. The lower temperature for the WR region equals the minimum WR leg average value. The upper temperature for the WR regions equals the minimum WR leg average value plus two times the WR region size. The WR region size is as specified in the configuration setup.

Figure 14:
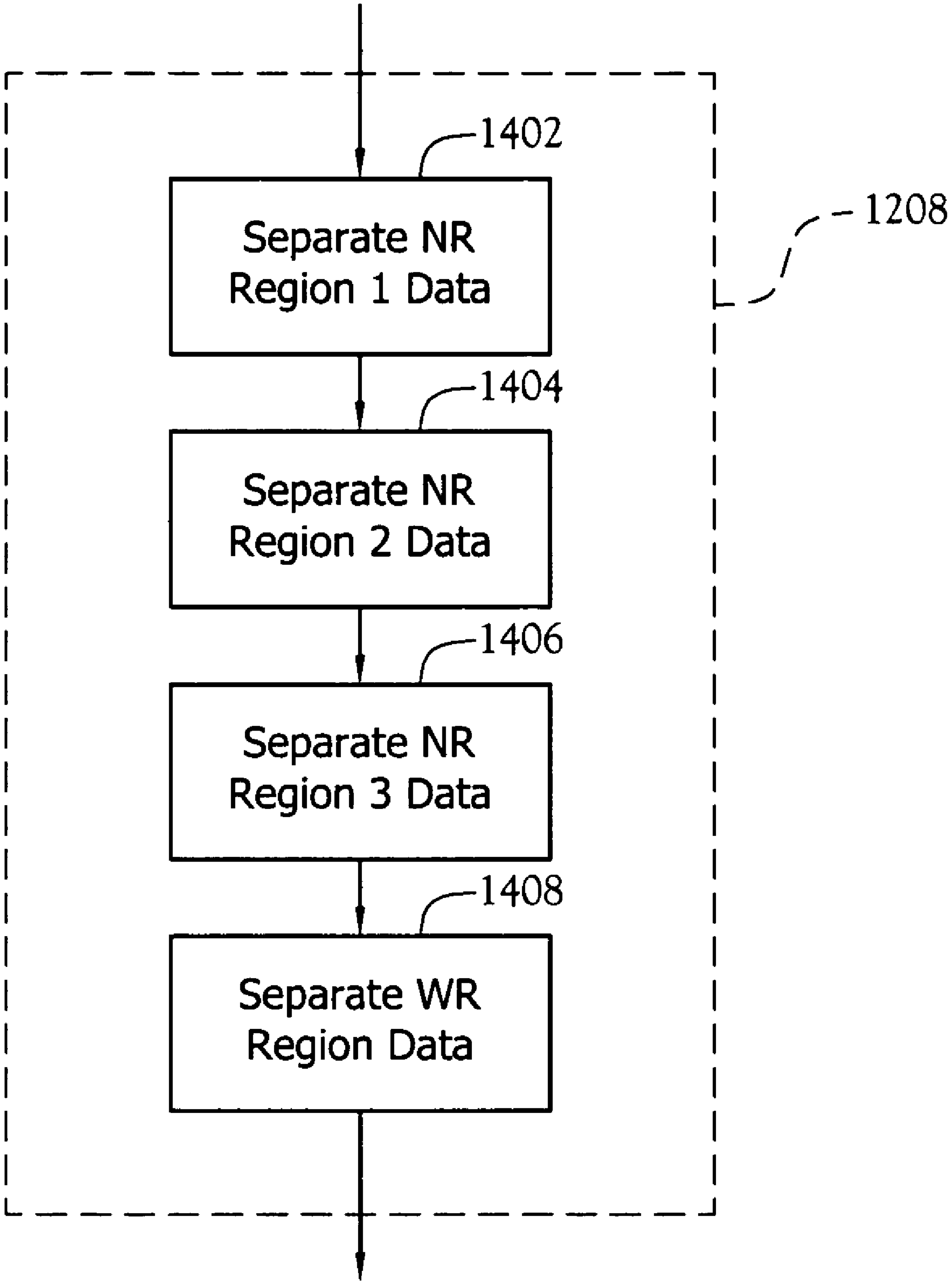
FIG. 14 is a block diagram of one embodiment of the separate RTD data into regions routine.

The next step illustrated in FIG. 12 is to separate the RTD data into regions 1208. FIG. 14 illustrates a block diagram of one embodiment of the functional steps for separating the RTD data into regions 1208. The next step is to match the CET time to the remaining RTD data 1210 because the sample times must be the same for comparison.

FIG. 13 illustrates a block diagram of one embodiment of the functional steps for calculating the three NR regions 1204. The first step is to calculate the region 1 values 1302. In one embodiment, the lower temperature equals the NR maximum temperature minus two times the NR region size. The upper temperature equals the NR maximum temperature. The NR maximum and the NR region size are as specified in the configuration setup.

The next step is to calculate the region 2 values 1304. In one embodiment, the lower temperature equals the NR minimum plus the NR maximum temperature, divided by two, minus the NR region size. The upper temperature equals the NR minimum plus the NR maximum temperature, divided by two, plus the NR region size. The NR minimum and maximum temperatures and the NR region size are as specified in the configuration setup.

The next step is to calculate the region 3 values 1306. In one embodiment, the lower temperature equals the NR minimum temperature. The upper temperature equals the NR minimum temperature plus two times the NR region size. The NR minimum and the NR region size are as specified in the configuration setup.

FIG. 14 illustrates a block diagram of one embodiment of the functional steps for separating the RTD data into regions 1208. The first three steps are to separate the NR region 1 data 1402, separate the NR region 2 data 1404, and separate the NR region 3 data 1406. Each of these steps 1402, 1404, 1406 includes all timeslices where the NR average is within specified NR region. The final step is to separate the WR region data 1408, which includes all timeslices where the WR average is within the WR region.

FIG. 15 illustrates a block diagram of one embodiment of the functional steps for fluctuation removal, or removing deviate data, 406. The first step is to calculate the average of the NR standard deviation (SD) 1502. The result is called the average NR fluctuation. The second step is to calculate the standard deviation (SD) around the average NR fluctuation 1504. The result is called the NR fluctuation standard deviation (SDEV). The next step is a decision point whether to skip fluctuation removal 1506. In one embodiment, this decision is determined by testing for the SDEV limit (multiplier)=0. If not being skipped, then the next step is to reject the timeslices 1508 and then match the CET times 1510 to the RTD times. Rejecting the timeslice 1508 includes rejecting all timeslices where the NR standard deviation is not within the average NR fluctuation plus-or-minus the NR fluctuation standard deviation times the SDEV limit. If the fluctuation removal is to be skipped, then the next step is to match the CET times 1510 to the RTD times and not remove the deviation data. The SDEV limit is as specified in the configuration setup.

Figure 17:
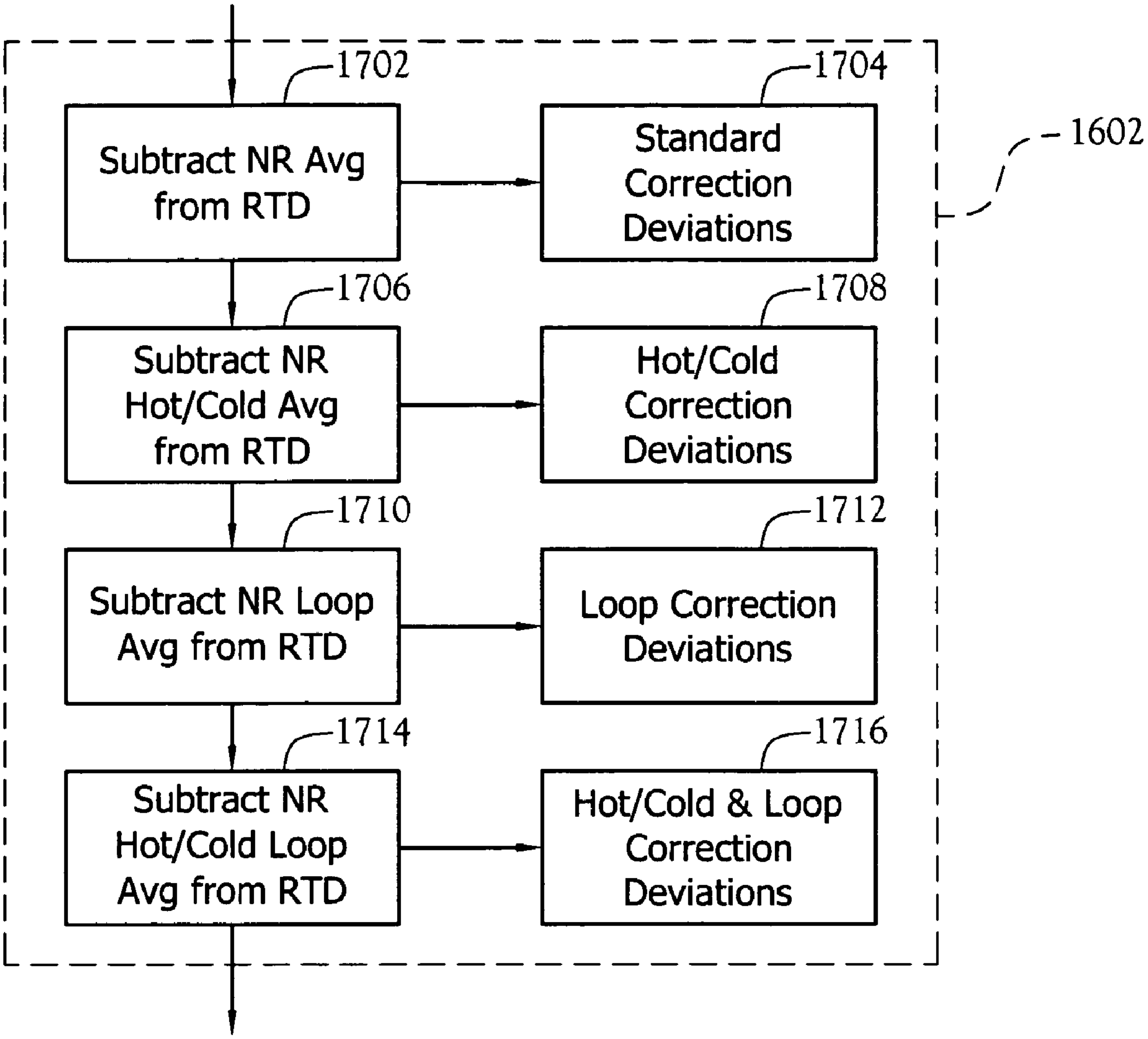
FIG. 17 is a block diagram of one embodiment of the calculate deviations in narrow range regions routine.
Figure 18:
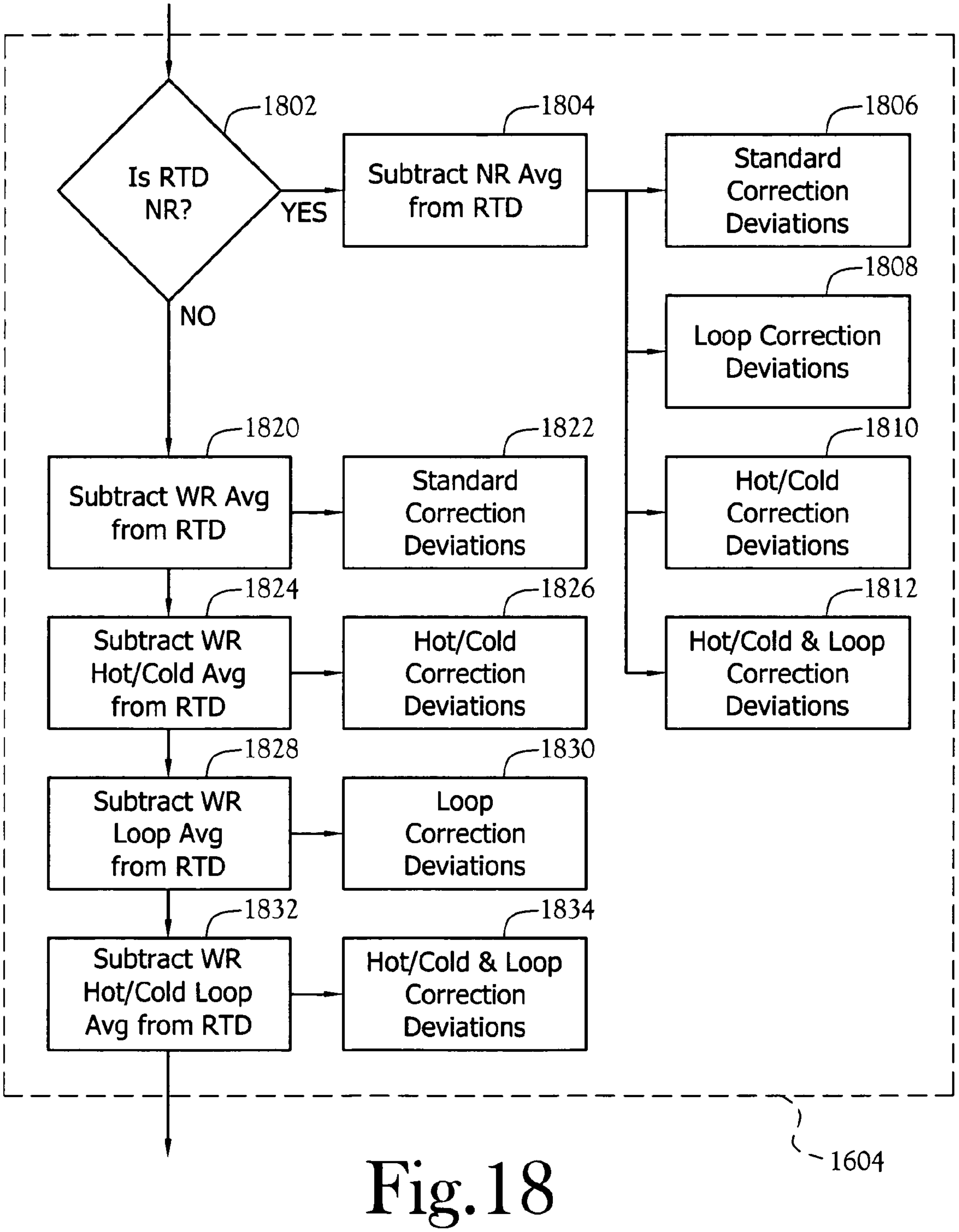
FIG. 18 is a block diagram of one embodiment of the calculate deviations in wide range regions routine.
Figure 19:
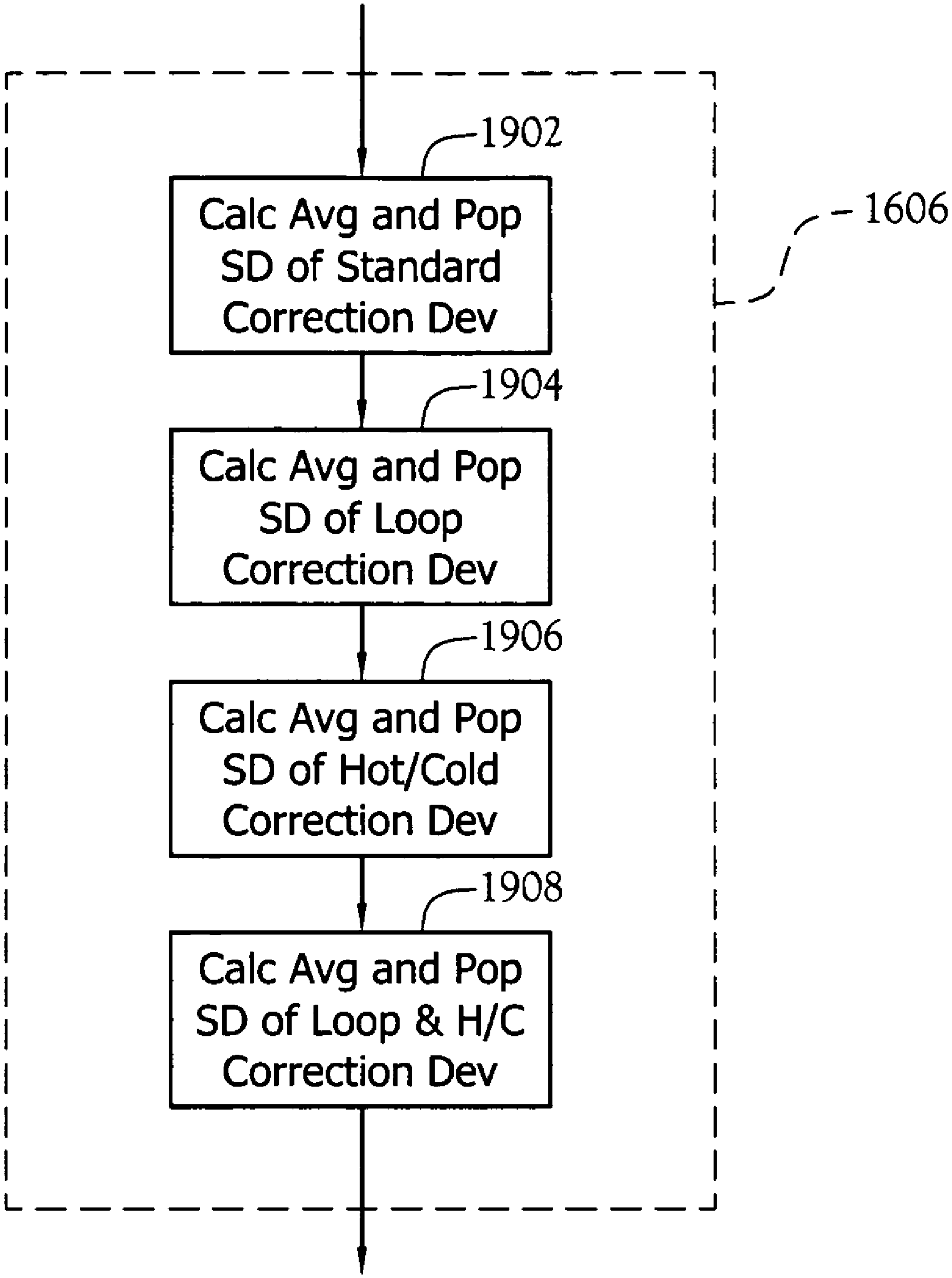
FIG. 19 is a block diagram of one embodiment of the calculate average deviation and standard deviation for each RTD routine.
Figure 20:
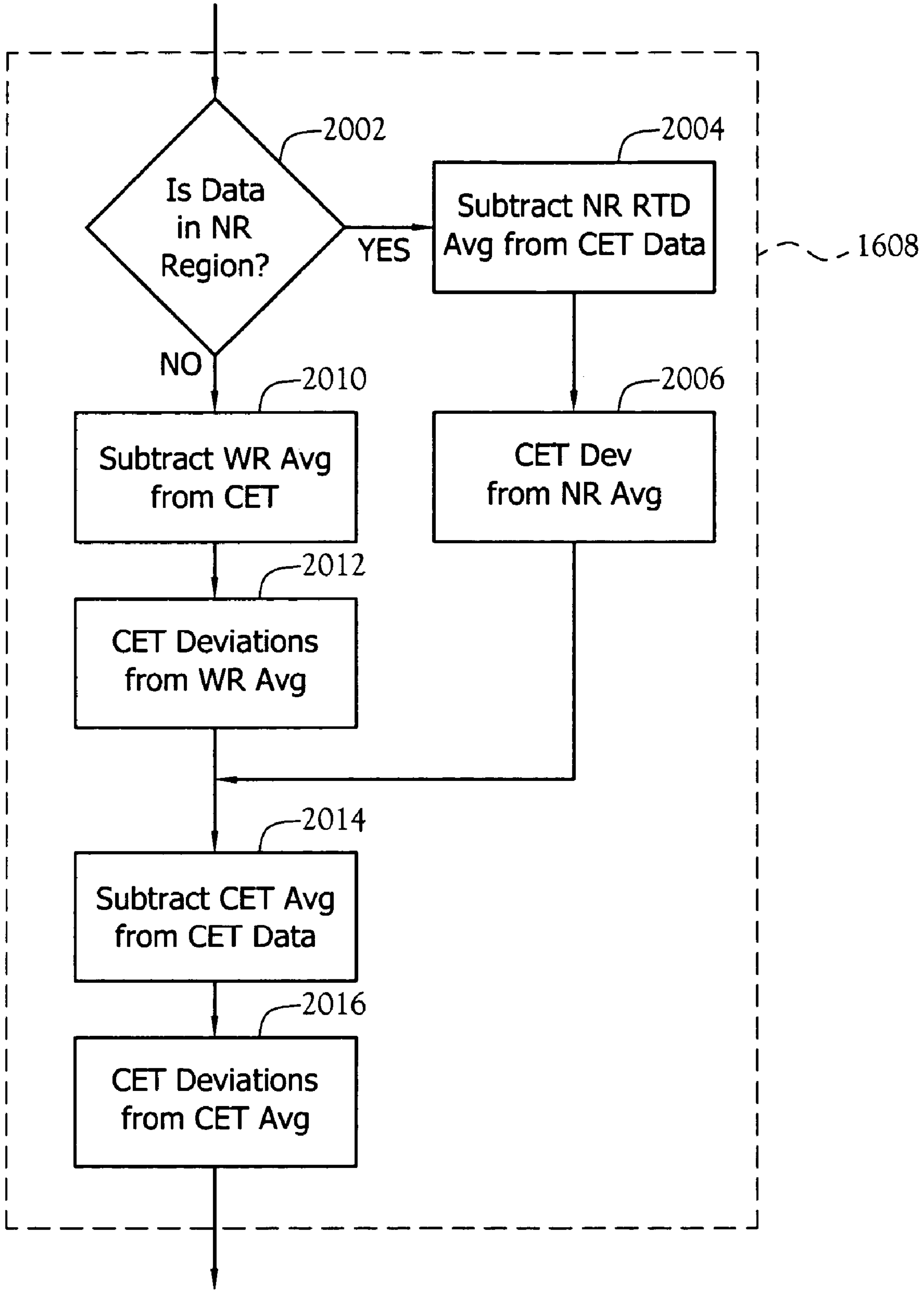
FIG. 20 is a block diagram of one embodiment of the calculate CET deviations routine.
Figure 21:
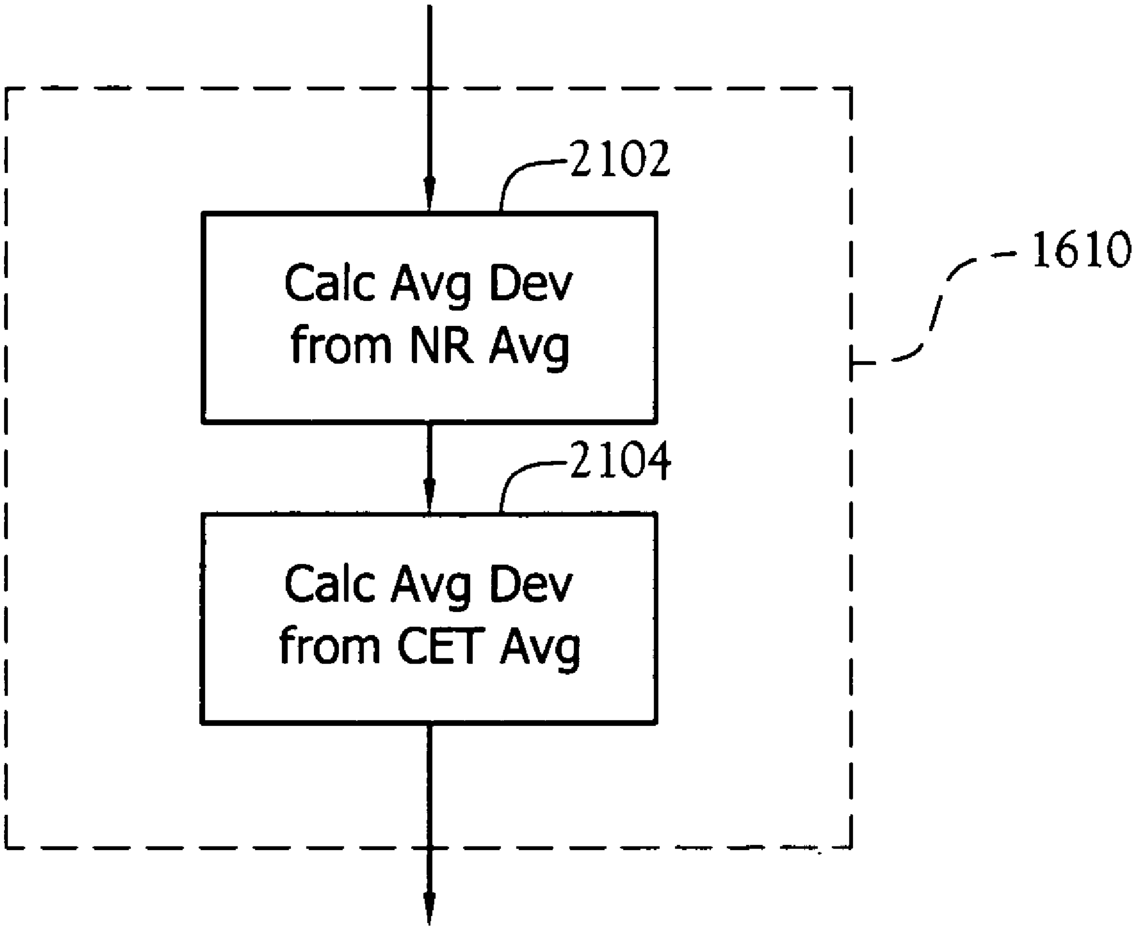
FIG. 21 is a block diagram of one embodiment of the calculate average deviation for each CET routine.

FIG. 16 illustrates a block diagram of one embodiment of the functional steps for analyzing the data 408. The first step is to calculate the RTD deviation in the three NR regions 1602. FIG. 17 illustrates a block diagram of one embodiment of the functional steps for calculating the RTD deviation in the three NR regions 1602. The second step is to calculate the RTD deviation in the one WR region 1604. FIG. 18 illustrates a block diagram of one embodiment of the functional steps for calculating the RTD deviation in the one WR region 1604. The next step is to calculate the average and standard deviation for the deviations of each RTD 1606. FIG. 19 illustrates a block diagram of one embodiment of the functional steps for calculating the average and standard deviation for the deviations of each RTD 1606. The next step is to calculate the CET deviations in each region 1608. FIG. 20 illustrates a block diagram of one embodiment of the functional steps for calculating the CET deviations in each region 1608. The final step illustrated in FIG. 16 is to calculate the average for the deviations of each CET 1610. FIG. 21 illustrates a block diagram of one embodiment of the functional steps for calculating the average for the deviations of each CET 1610.

FIG. 17 illustrates a block diagram of one embodiment of the functional steps for calculating the RTD deviations in the three NR regions 1602. The steps illustrated in FIG. 17 are performed for each region and for each RTD. The first step is to subtract the NR average from the RTD value for each timeslice 1702. The results of this step are entered into a table of standard correction deviations 1704. The next step is to subtract the appropriate NR hot or cold average from the RTD value for each timeslice 1706. The results of this step are entered into a table of the hot/cold correction deviations 1708. The next step is to subtract the appropriate NR loop average from the RTD value for each timeslice 1710. The results of this step are entered into a table of the loop correction deviations 1712. The next step is to subtract the appropriate NR hot or cold loop average from the RTD value for each timeslice 1714. The results of this step are entered into a table of the hot/cold and loop correction deviations 1716.

FIG. 18 illustrates a block diagram of one embodiment of the functional steps for calculating the RTD deviation in the one WR region 1604. The steps illustrated in FIG. 18 are performed for each RTD. The first step is to determine whether the RTD is a NR RTD 1802. If it is, the next step is to subtract the NR average from each RTD valued for each timeslice (zero) 1804. The results of this step are entered into the tables for the standard correction deviations 1806, the loop correction deviations 1808, the hot/cold correction deviations 1810, and the hot/cold and loop correction deviations 1812. If the RTD is not an NR RTD, the next step is to subtract the WR average from each RTD for each timeslice 1820. The results of this step are entered into a table of the standard correction deviations 1822. The next step is to subtract the appropriate WR hot or cold average from each RTD for each timeslice 1824. The results of this step are entered into a table of the hot/cold correction deviations 1826. The next step is to subtract the appropriate WR loop average from each RTD for each timeslice 1828. The results of this step are entered into a table of the loop correction deviations 1830. The next step is to subtract the appropriate WR hot or cold loop average from each RTD for each timeslice 1832. The results of this step are entered into a table of the hot/cold and loop correction deviations 1834.

FIG. 19 illustrates a block diagram of one embodiment of the functional steps for calculating the average deviation and the standard deviation for the deviations of each RTD 1606. The steps illustrated in FIG. 19 are performed for each RTD. The first step is to calculate the average and population standard deviation of the table of standard correction deviations 1902. The next step is to calculate the average and population standard deviation of the table of loop correction deviations 1904. The next step is to calculate the average and population standard deviation of the table of hot/cold correction deviations 1906. The next step is to calculate the average and population standard deviation of the table of hot/cold (both) and loop correction deviations 1908.

FIG. 20 illustrates a block diagram of one embodiment of the functional steps for calculating the CET deviations in each region 1608. The first step is to determine if the data is in the NR region 2002. If the data is in the NR region, the first step is to subtract the matched NR RTD average from the CET data 2004. The results of this step produces the CET deviations from the NR average 2006. The next step is to subtract the CET average from the CET data 2014, thereby producing the CET deviations from the CET average 2016. If the data is not in the NR region, the first step is to subtract the matched WR RTD average from the CET data 2010. The results of this step produces the CET deviations from the WR average 2012. The next step is to subtract the CET average from the CET data 2014, thereby producing the CET deviations from the CET average 2016.

FIG. 21 illustrates a block diagram of one embodiment of the functional steps for calculating the average for the deviations of each CET 1610. The steps illustrated in FIG. 21 are performed for each CET. The first step is to calculate the average of deviations from NR average 2102. The next step is to calculate the average of deviations from the CET average 2104.

Figure 23:
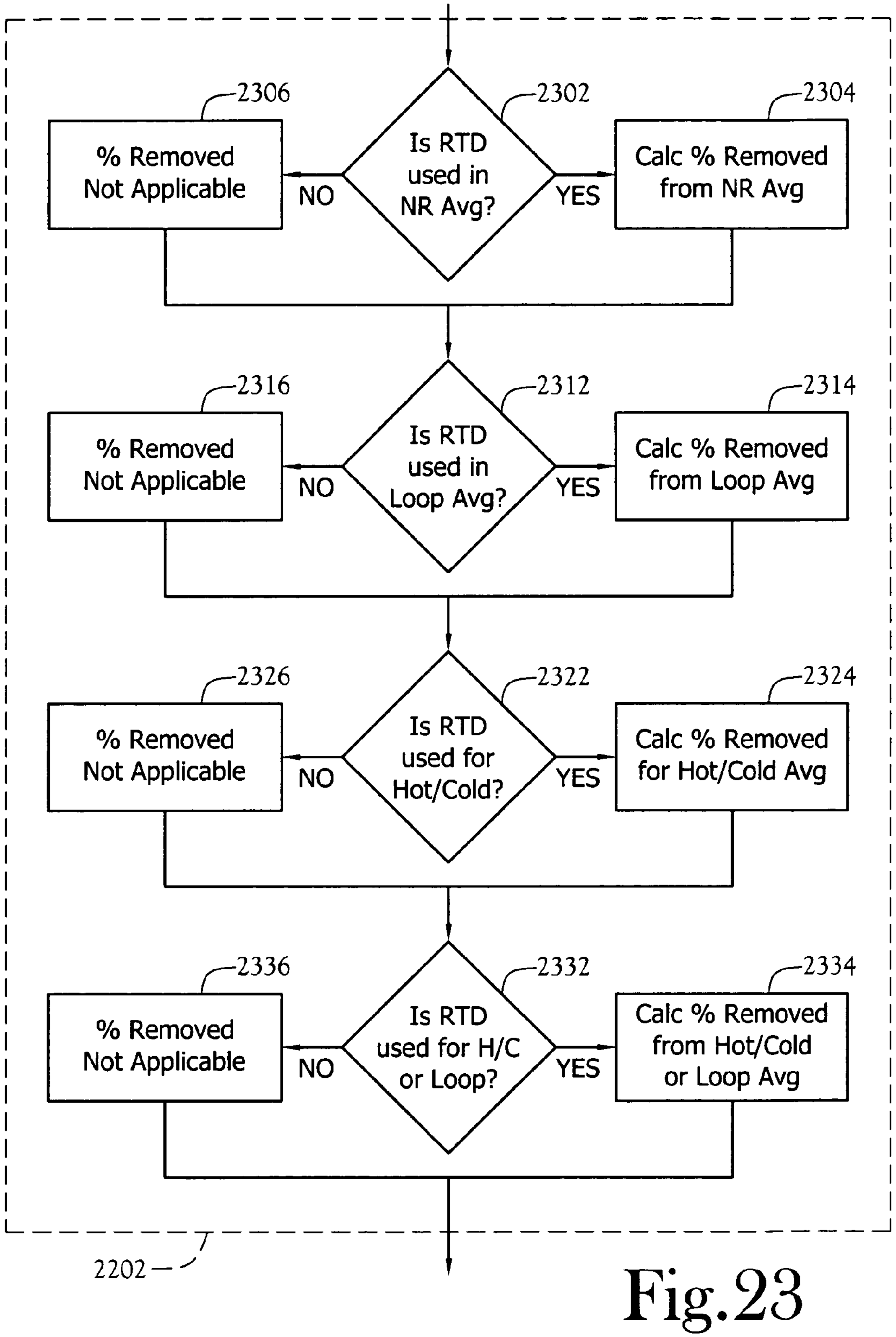
FIG. 23 is a block diagram of one embodiment of the calculate percent removed for narrow range regions routine.
Figure 24:
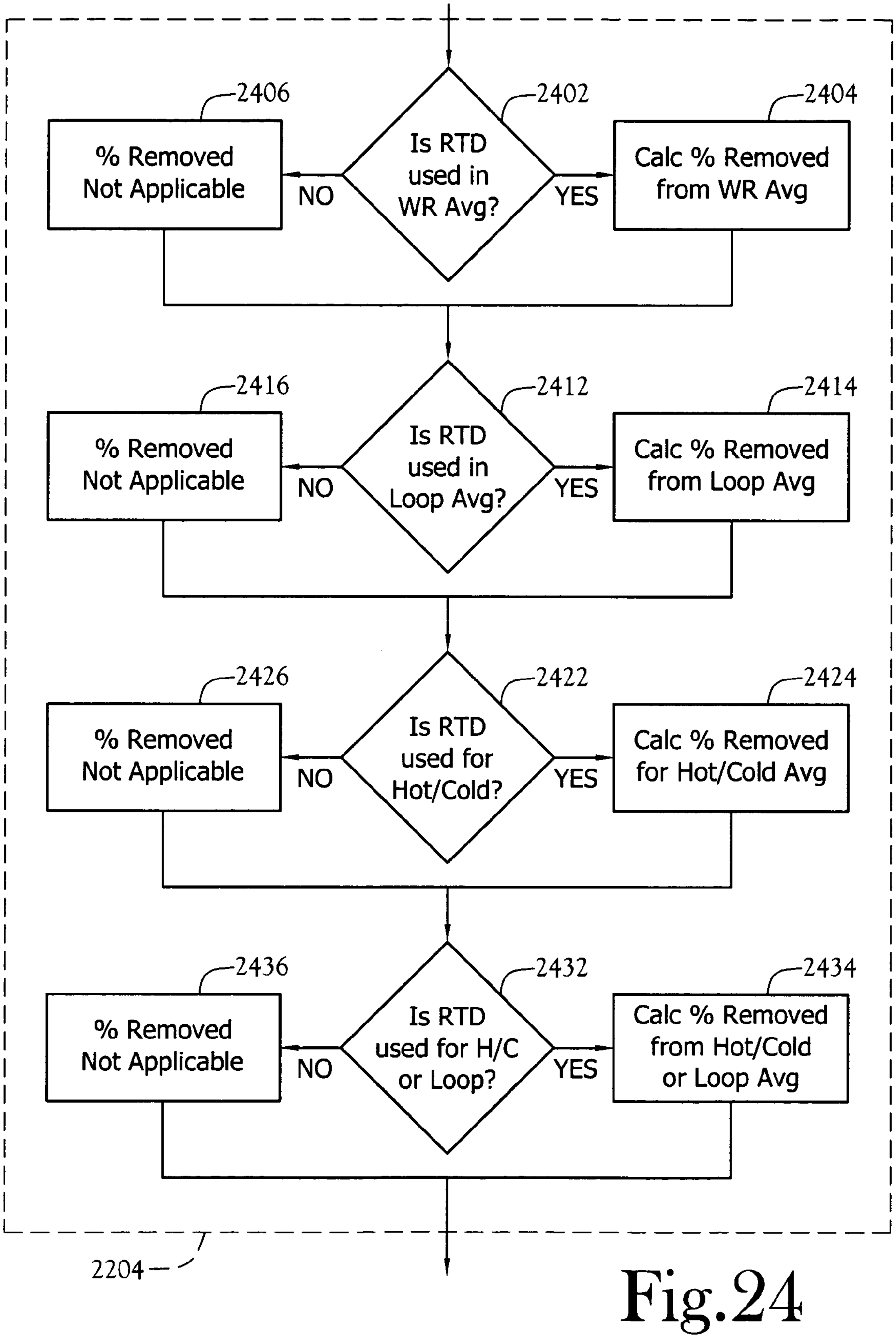
FIG. 24 is a block diagram of one embodiment of the calculate percent removed for wide range region routine.
Figure 25:
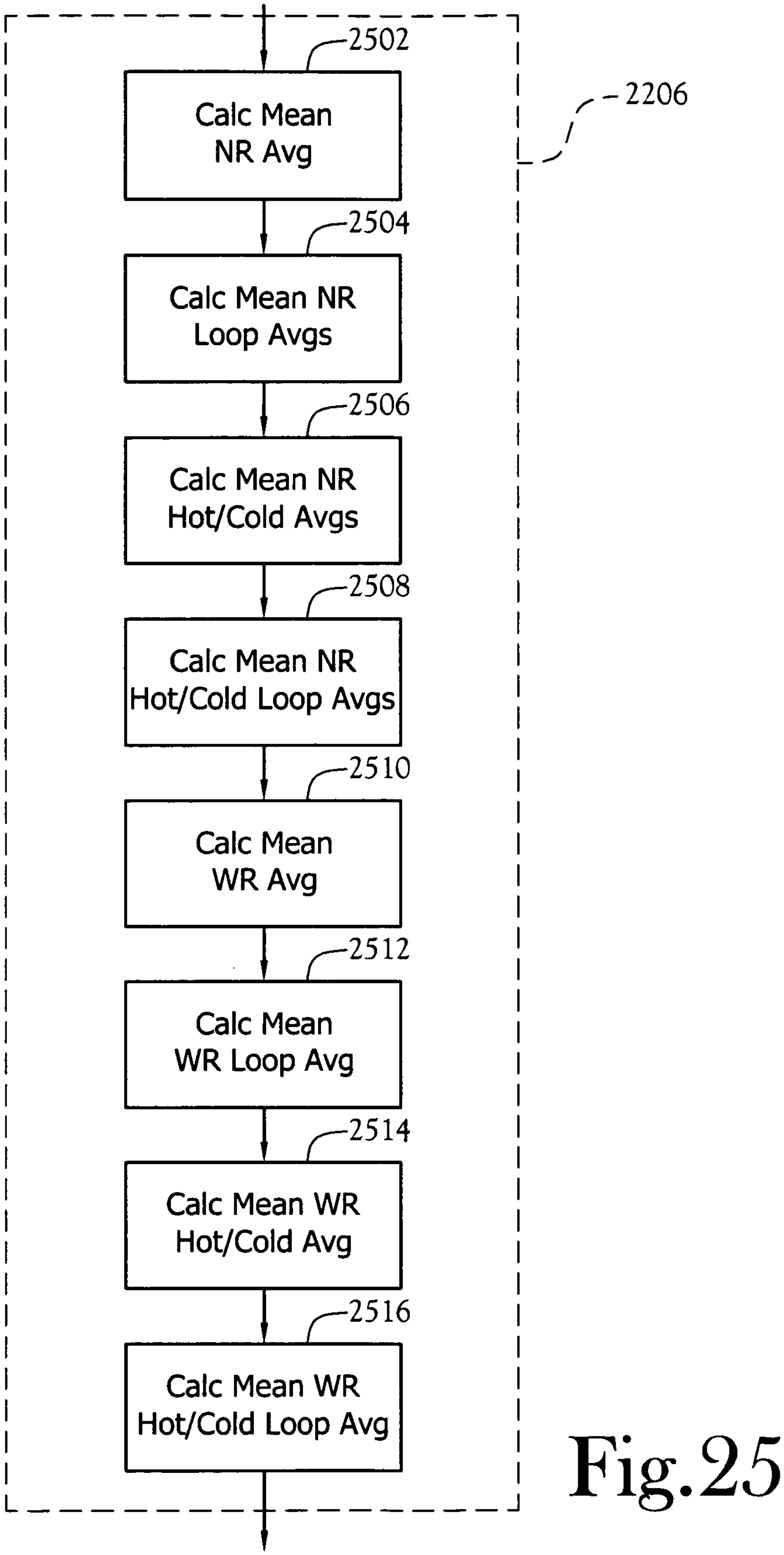
FIG. 25 is a block diagram of one embodiment of the calculate the mean value of the averages routine.

FIG. 22 illustrates a block diagram of the functional steps for generating the RTD report 410. The first step is to calculate the percent removed for the NR region 2202. FIG. 23 illustrates a block diagram of one embodiment of the functional steps for calculating the percent removed for the NR region 2202. The next step is to calculate the percent removed for the WR region 2204. FIG. 24 illustrates a block diagram of one embodiment of the functional steps for calculating the percent removed for the WR region 2204. The next step is to calculate the mean value of all averages 2206. FIG. 25 illustrates a block diagram of one embodiment of the functional steps for calculating the mean value of all averages 2206. The next step is to select the correction method and temperature region 2208. The user chooses which temperature region and correction method to use for results. The final step illustrated in FIG. 22 is to compare the RTD results with the limits 2210.

FIG. 23 illustrates a block diagram of one embodiment of the functional steps for calculating the percent removed for the NR region 2202. The steps illustrated in FIG. 23 are performed for each NR region and for each RTD. With respect to the calculations for percent removed identified for FIG. 23, the percent removed for each RTD is calculated by dividing the number of samples exceeding the averaging criteria by the number of samples in the region.

The first step illustrated in FIG. 23 is to determine whether the RTD is used in the NR average 2302. If the RTD is used in the NR average, the next step is to calculate the percent removed from the NR average 2304 for the table of the standard correction deviations. If not, then the percent removed is not applicable for this RTD for the table of the standard correction deviations 2406. The next step is to determine whether the RTD is used in the loop average 2312. If the RTD is used in the loop average, the next step is to calculate the percent removed from the loop average 2314 for the table of the loop correction deviations. If not, then the percent removed is not applicable for this RTD for the table of the loop correction deviations 2416. The next step is to determine whether the RTD is used in for the hot/cold average 2322. If the RTD is used in the hot/cold average, the next step is to calculate the percent removed from the hot/cold average 2324 for the table of the hot/cold correction deviations. If not, then the percent removed is not applicable for this RTD for the table of the hot/cold correction deviations 2426. The next step is to determine whether the RTD is used in the hot/cold or loop average 2332. If the RTD is used in the loop average, the next step is to calculate the percent removed from the hot/cold or loop average 2334 for the table of the hot/cold or loop correction deviations. If not, then the percent removed is not applicable for this RTD for the table of the hot/cold or loop correction deviations 2436.

FIG. 24 illustrates a block diagram of one embodiment of the functional steps for calculating the percent removed for the WR region 2204. The steps illustrated in FIG. 24 are performed for each WR region and for each RTD. With respect to the calculations for percent removed identified for FIG. 24, the percent removed for each RTD is calculated by dividing the number of samples exceeding the averaging criteria by the number of samples in the region.

The first step illustrated in FIG. 24 is to determine whether the RTD is used in the WR average 2402. If the RTD is used in the WR average, the next step is to calculate the percent removed from the WR average 2404 for the table of the standard correction deviations. If not, then the percent removed is not applicable for this RTD for the table of the standard correction deviations 2406. The next step is to determine whether the RTD is used in the loop average 2412. If the RTD is used in the loop average, the next step is to calculate the percent removed from the loop average 2414 for the table of the loop correction deviations. If not, then the percent removed is not applicable for this RTD for the table of the loop correction deviations 2416. The next step is to determine whether the RTD is used in for the hot/cold average 2422. If the RTD is used in the hot/cold average, the next step is to calculate the percent removed from the hot/cold average 2424 for the table of the hot/cold correction deviations. If not, then the percent removed is not applicable for this RTD for the table of the hot/cold correction deviations 2426. The next step is to determine whether the RTD is used in the hot/cold or loop average 2432. If the RTD is used in the loop average, the next step is to calculate the percent removed from the hot/cold or loop average 2434 for the table of the hot/cold or loop correction deviations. If not, then the percent removed is not applicable for this RTD for the table of the hot/cold or loop correction deviations 2436.

FIG. 25 illustrates a block diagram of one embodiment of the functional steps for calculating the mean value of all averages 2206. The steps illustrated in FIG. 25 are performed for each region. The first step is to calculate the mean NR average 2502. The next step is to calculate the mean NR loop averages 2504, the mean NR hot and cold averages 2506, and the mean NR hot and cold loop averages 2508. The next step is to calculate the mean WR average 2510, the mean WR loop averages 2512, the mean WR hot and cold averages 2514, and the mean WR hot and cold loop averages 2516.

Figure 27:
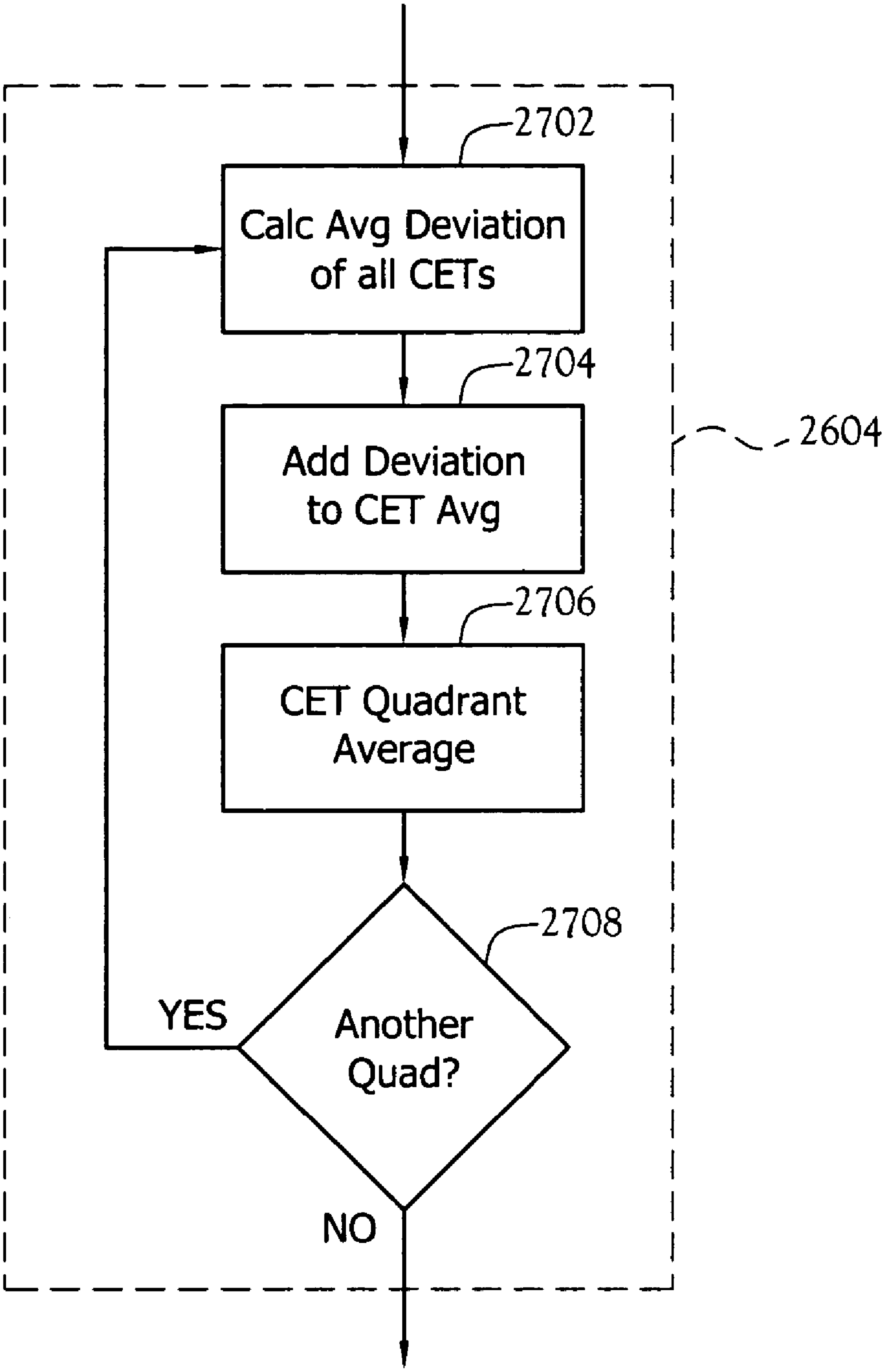
FIG. 27 is a block diagram of one embodiment of the calculate CET quadrant averages for each region routine.

FIG. 26 illustrates a block diagram of the functional steps for generating the CET report 412. The first step is to calculate the percent of CET removed from the CET average for each CET 2602. The next step is to calculate the CET quadrant averages 2604. FIG. 27 illustrates a block diagram of one embodiment of the functional steps for calculating the CET quadrant averages 2604. The next step is to select the correction and region 2606. The final step illustrated in FIG. 26 is to compare the CET results with the limits 2608.

FIG. 27 illustrates a block diagram of one embodiment of the functional steps for calculating the CET quadrant averages 2604. The first step is to calculate the average deviation of all CETs in the quadrant within the CET averaging criteria 2702. Then, the deviations are added to the CET average for the region 2704. This results in the CET quadrant average 2706. The next step is to determine whether any quadrants remain 2708. If there is another quadrant not yet calculated, then the process is repeated starting at the calculation step 2702. If no quadrants remain to be averaged, the routine exits.

Figure 29:
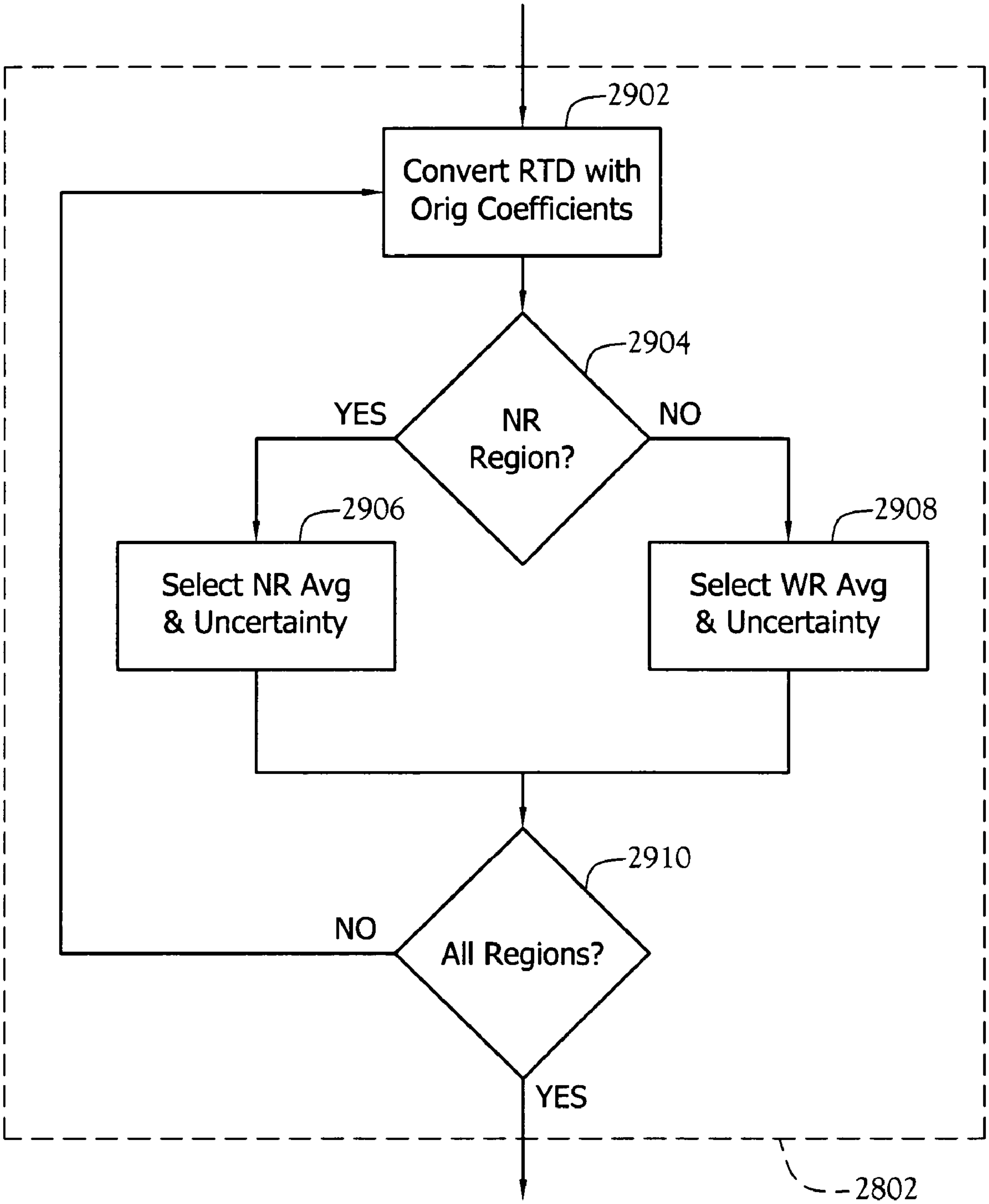
FIG. 29 is a block diagram of one embodiment of the calculate resistance versus temperature table for selected RTD routine.
Figure 30:
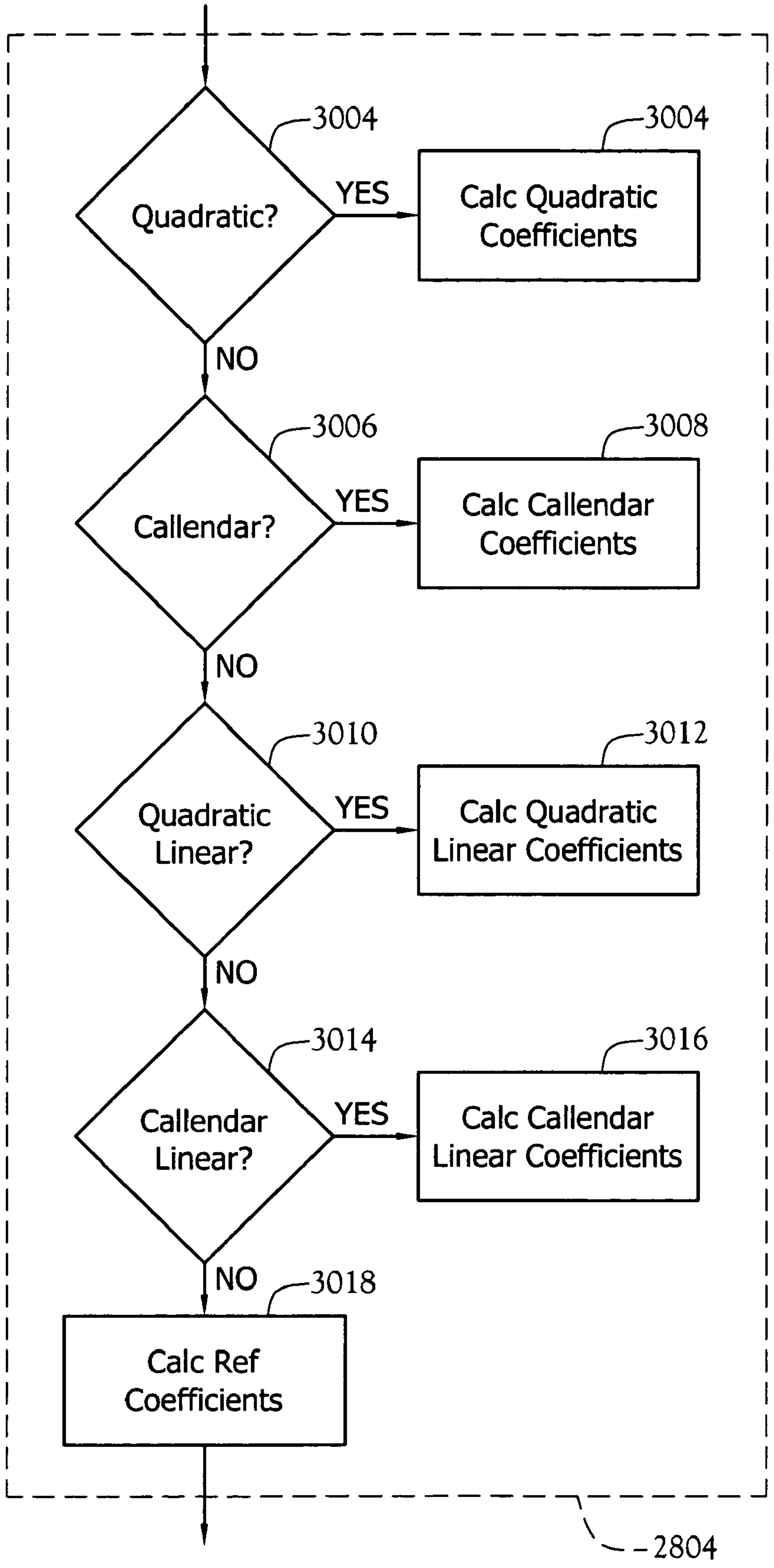
FIG. 30 is a block diagram of one embodiment of the calculate new coefficient routine.
Figure 36:
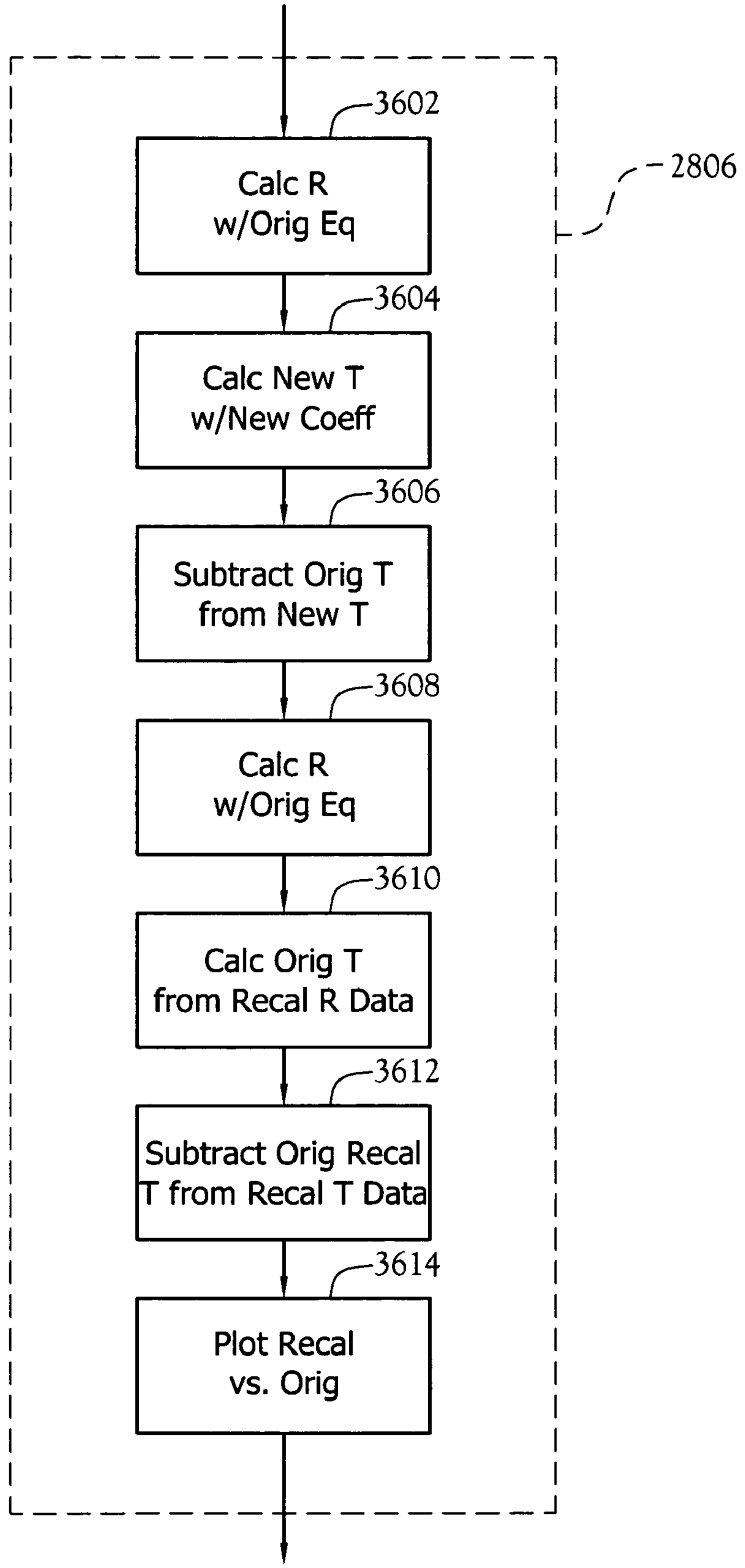
FIG. 36 is a block diagram of one embodiment of the produce recalibration-original plot routine.
Figure 37:
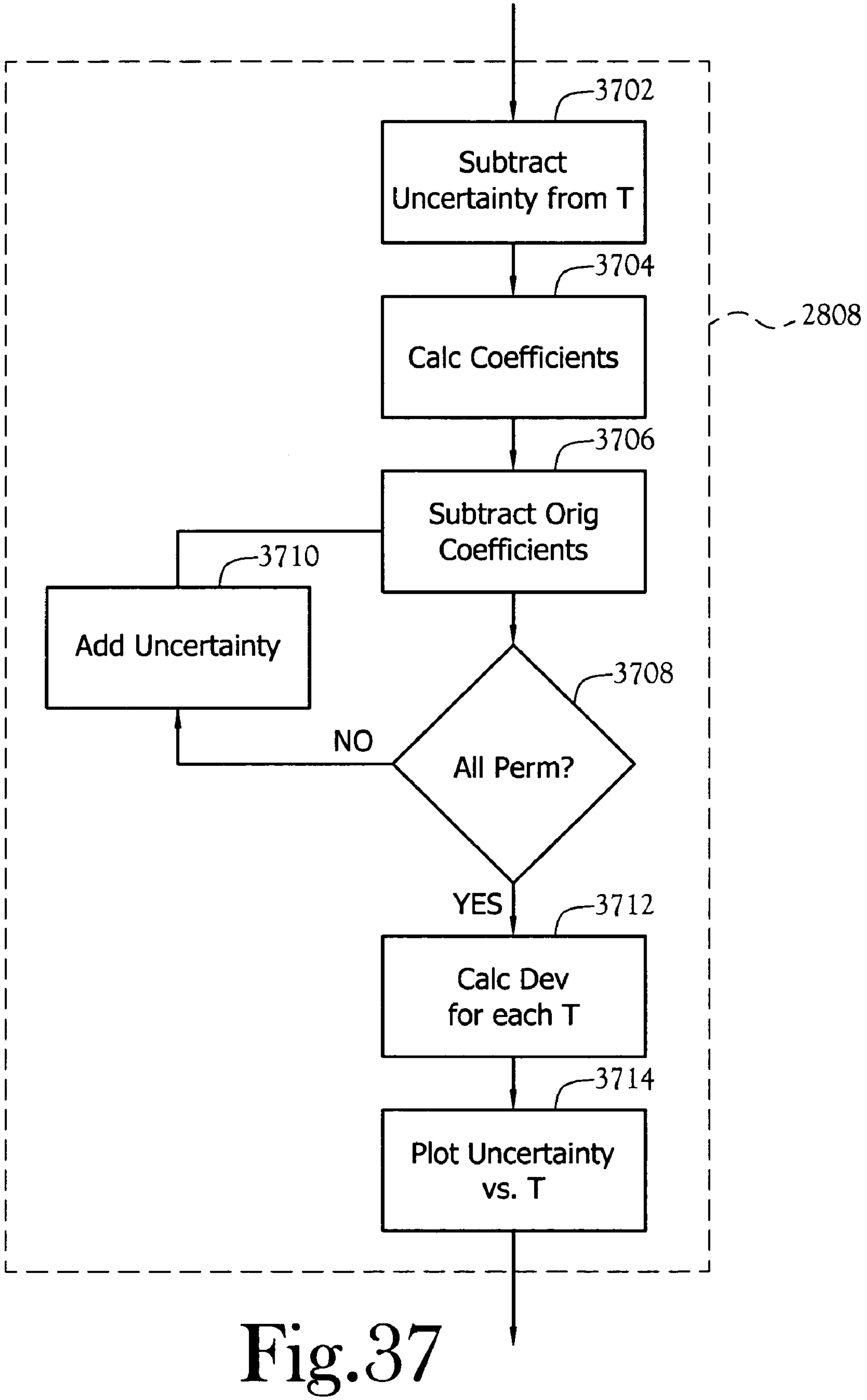
FIG. 37 is a block diagram of one embodiment of the recalibration uncertainty calculation routine.

FIG. 28 illustrates a block diagram of the functional steps for recalibrating any deviating RTDs 414. Only deviating RTDs are recalibrated in accordance with the routine illustrated in FIG. 28. The first step is to calculate a resistance versus temperature table 2802. FIG. 29 illustrates a block diagram of one embodiment of the functional steps for calculating a resistance versus temperature table 2802. The next step is to calculate new coefficients 2804. FIG. 30 illustrates a block diagram of one embodiment of the functional steps for calculating new coefficients 2804. The next step is to produce a recalibration-original calibration plot 2806. FIG. 36 illustrates a block diagram of one embodiment of the functional steps for producing a recalibration-original calibration plot 2806. The next step is to calculate the recalibration uncertainty 2808. FIG. 37 illustrates a block diagram of one embodiment of the functional steps for calculating the recalibration uncertainty 2808.

FIG. 29 illustrates a block diagram of one embodiment of the functional steps for calculating a resistance versus temperature table 2802. The first step is to convert the RTD temperature into a resistance value with the original coefficients 2902. The second step is to determine whether the RTD is in the NR region 2904. If it is the NR region, the next step is to select NR and average uncertainty values 2906. If not, then the next step is to select WR average and uncertainty values 2908. The results of these two steps 2906, 2908 leads to the next step, which is to determine if all the regions have been processed 2910. If not, the routine is repeated starting at the conversion step 2902.

Figure 31:
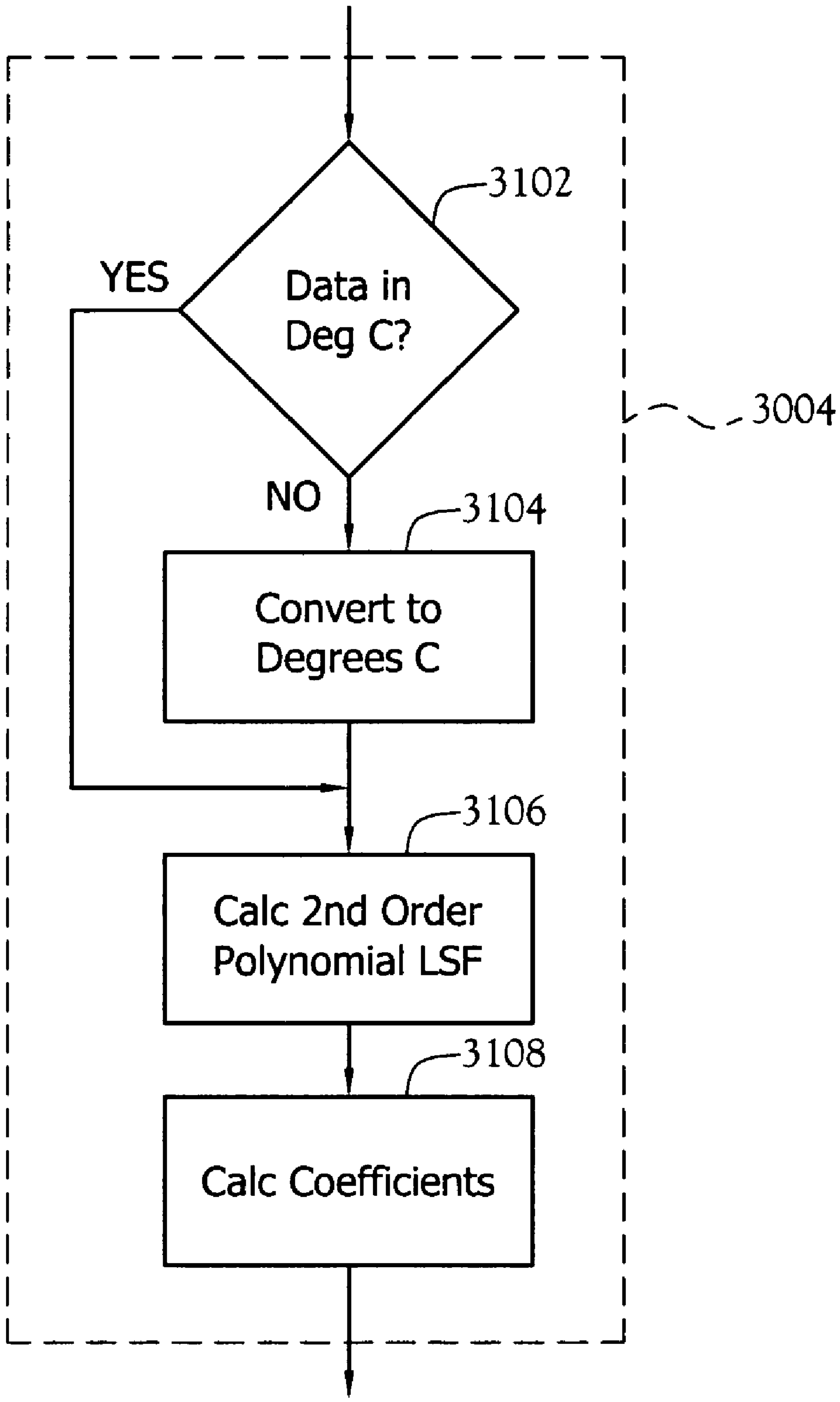
FIG. 31 is a block diagram of one embodiment of the calculate quadratic coefficient routine.
Figure 32:
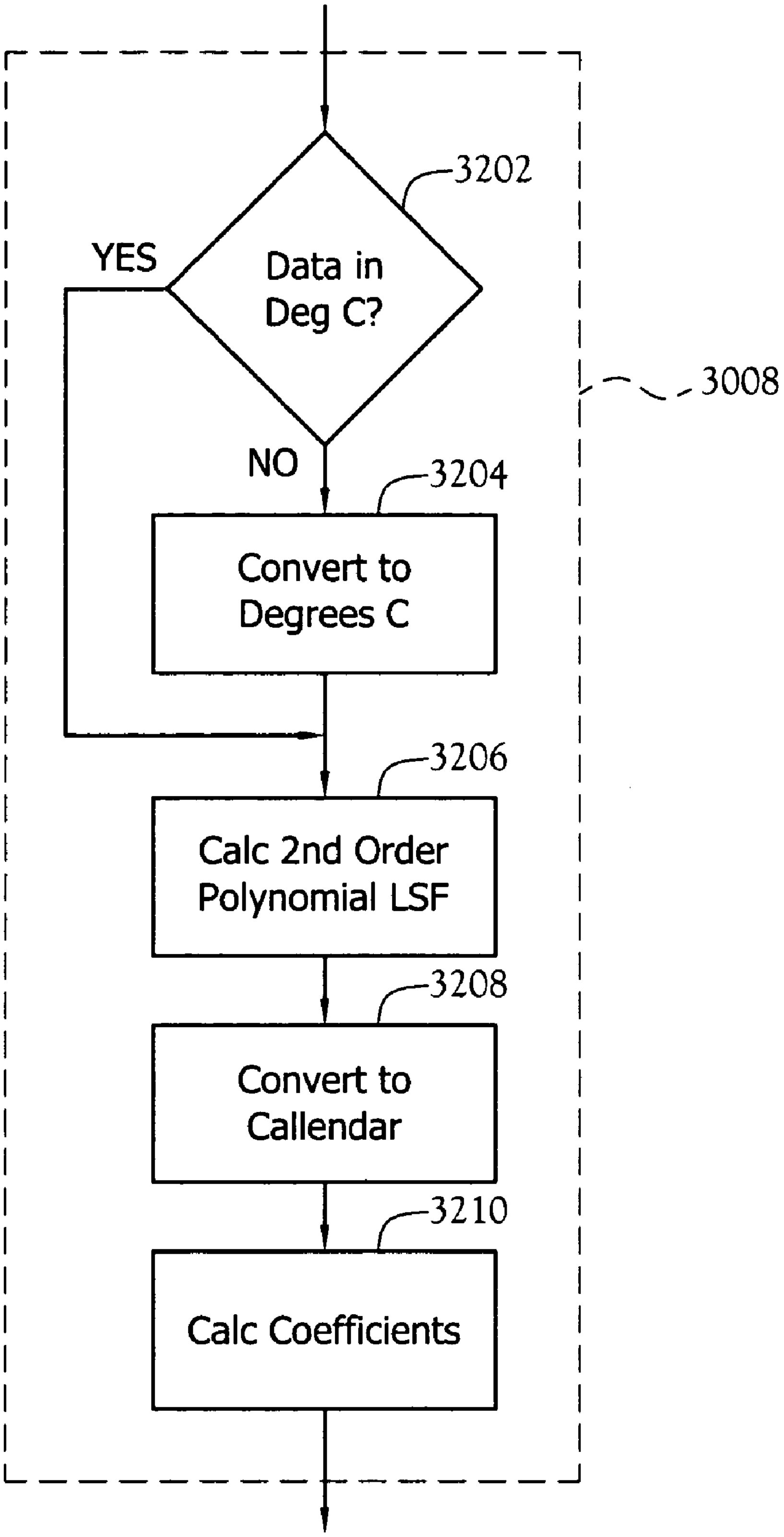
FIG. 32 is a block diagram of one embodiment of the calculate Callendar coefficient routine.
Figure 33:
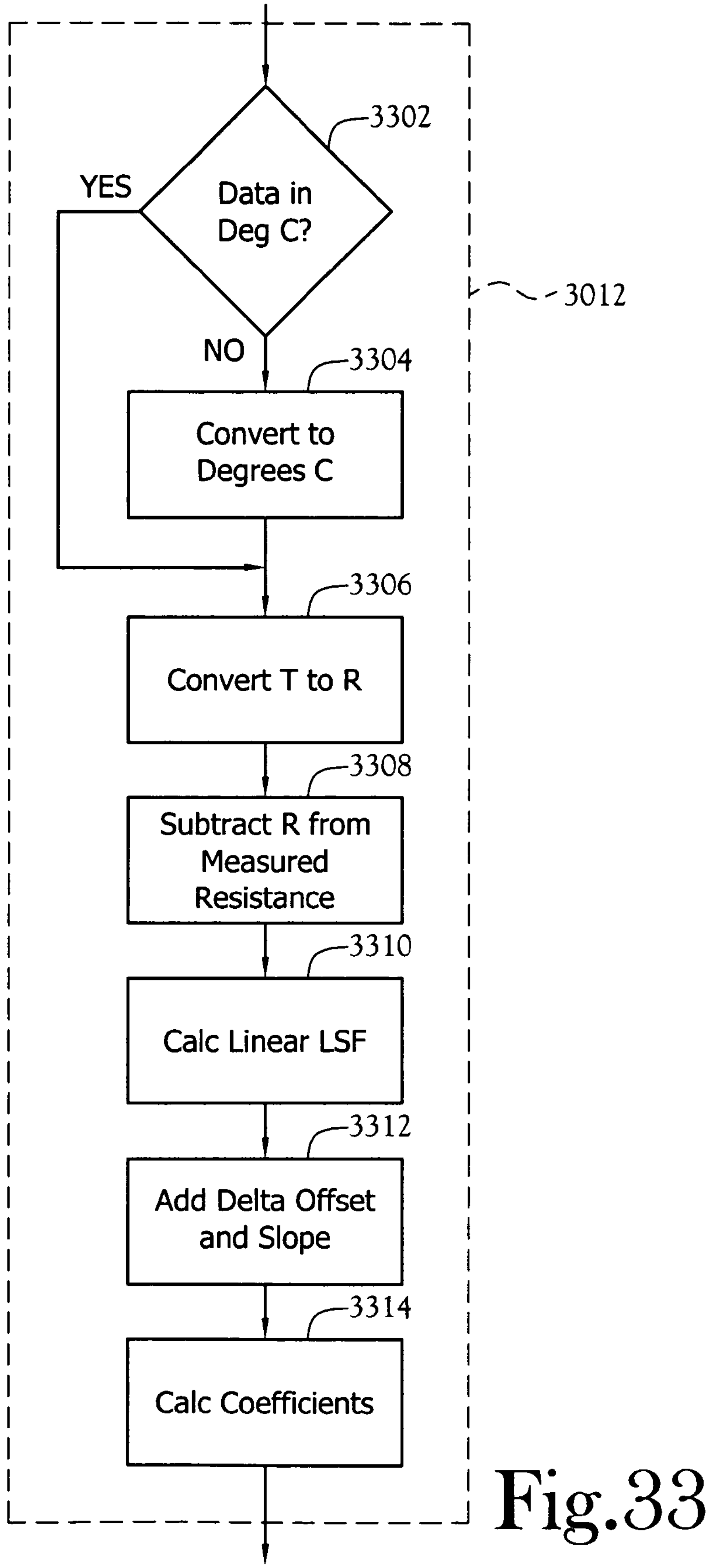
FIG. 33 is a block diagram of one embodiment of the calculate quadratic linear coefficient routine.
Figure 34:
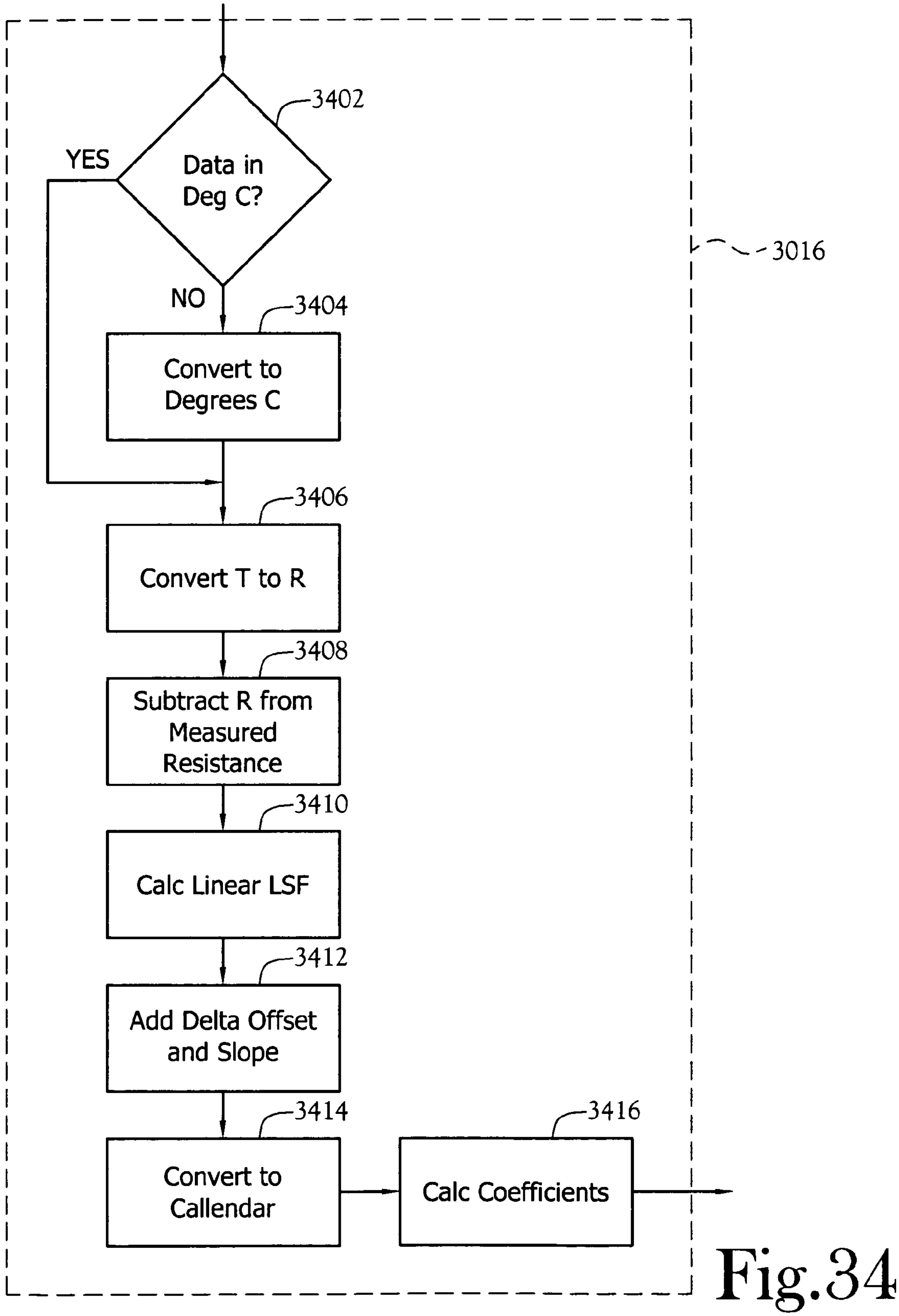
FIG. 34 is a block diagram of one embodiment of the calculate Callendar linear coefficient routine.
Figure 35:
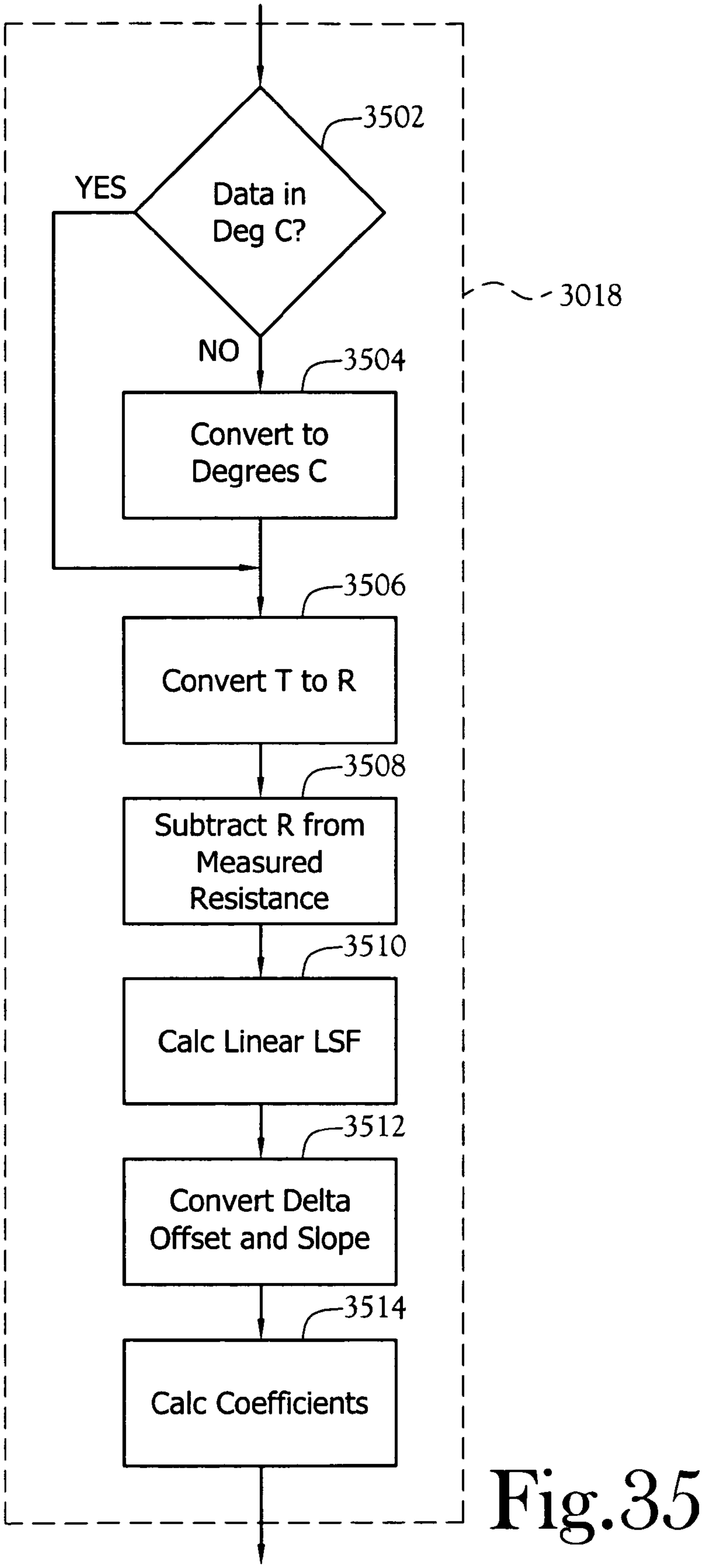
FIG. 35 is a block diagram of one embodiment of the calculate reference coefficient routine.

FIG. 30 illustrates a block diagram of one embodiment of the functional steps for calculating new coefficients 2804. The first step is to determine whether quadratic coefficients are to be calculated 3002. If so, the next step is to calculate quadratic coefficients 3004. FIG. 31 illustrates a block diagram of one embodiment of the functional steps for calculating quadratic coefficients 3004. If quadratic coefficients are not to be calculated, the next step is to determine if Callendar coefficients are to be calculated 3006. If so, the next step is to calculate Callendar coefficients 3008. FIG. 32 illustrates a block diagram of one embodiment of the functional steps for calculating Callendar coefficients 3008. If Callendar coefficients are not to be calculated, the next step is to determine if quadratic linear coefficients are to be calculated 3010. If so, the next step is to calculate quadratic linear coefficients 3012. FIG. 33 illustrates a block diagram of one embodiment of the functional steps for calculating quadratic linear coefficients 3012. If quadratic linear coefficients are not to be calculated, the next step is to determine if Callendar linear coefficients are to be calculated 3014. If so, the next step is to calculate Callendar linear coefficients 3016. FIG. 34 illustrates a block diagram of one embodiment of the functional steps for calculating Callendar linear coefficients 3016. If Callendar linear coefficients are not to be calculated, the next step is to calculate Westinghouse reference coefficients 3018. FIG. 35 illustrates a block diagram of one embodiment of the functional steps for calculating Westinghouse reference coefficients 3018.

FIG. 31 illustrates a block diagram of one embodiment of the functional steps for calculating quadratic coefficients 3004. The first step is to determine if the data is in degrees Celsius 3102. If not, then the data is converted to degrees Celsius 3104. If the data is already in degrees Celsius, then the conversion step 3104 is skipped. The next step is to calculate the second order polynomial least square fit (LSF) 3106 to determine the coefficients 3108. The coefficients are $R_0$, A, and B for the quadratic equation.

FIG. 32 illustrates a block diagram of one embodiment of the functional steps for calculating Callendar coefficients 3008. The first step is to determine if the data is in degrees Celsius 3202. If not, then the data is converted to degrees Celsius 3204. If the data is already in degrees Celsius, then the conversion step 3204 is skipped. The next step is to calculate the second order polynomial least square fit (LSF) 3206 and convert the coefficients to Callendar coefficients 3208. The final illustrated step is to determine the coefficients 3210. The coefficients are $R_0$, $\alpha$, and $\delta$ for the Callendar equation.

FIG. 33 illustrates a block diagram of one embodiment of the functional steps for calculating quadratic linear coefficients 3012. The first step is to determine if the data is in degrees Celsius 3302. If not, then the data is converted to degrees Celsius 3304. If the data is already in degrees Celsius, then the conversion step 3304 is skipped. The next step is to convert the temperature with the original coefficients to resistance $R_T$ 3306. The next step is to subtract $R_T$ from the measured resistance to determine $\Delta$R (delta resistance) 3308. The next step is to calculate the linear least square fit (LSF) to temperature and $\Delta$R 3310. Then, the $\Delta$ (delta) offset and the $\Delta$ slope are added to the original coefficients 3312 to calculate the coefficients 3314. The coefficients are $R_0$, A, and B for the quadratic linear equation.

FIG. 34 illustrates a block diagram of one embodiment of the functional steps for calculating Callendar linear coefficients 3016. The first step is to determine if the data is in degrees Celsius 3402. If not, then the data is converted to degrees Celsius 3404. If the data is already in degrees Celsius, then the conversion step 3404 is skipped. The next step is to convert the temperature with the original coefficients to resistance $R_T$ 3406. The next step is to subtract $R_T$ from the measured resistance to determine ΔR (delta resistance) 3308. The next step is to calculate the linear least square fit (LSF) to temperature and ΔR 3310. Then, the Δ (delta) offset and the Δ slope are added to the original coefficients 3312. The next step is to convert the coefficients to Callendar coefficients 3314. The final illustrated step is to determine the coefficients 3316. The coefficients are $R_0$, α, and δ for the Callendar linear equation.

FIG. 35 illustrates a block diagram of one embodiment of the functional steps for calculating Westinghouse reference coefficients 3018. The first step is to determine if the data is in degrees Celsius 3502. If not, then the data is converted to degrees Celsius 3504. If the data is already in degrees Celsius, then the conversion step 3504 is skipped. The next step is to convert the temperature to resistance by using a reference function $R_W$ 3506. The reference function $R_W$ is a function based on calculating coefficients as promulgated by Westinghouse Corporation. The next step is to subtract $R_W$ from the measured resistance to determine ΔR (delta resistance) 3508. The next step is to calculate the linear least square fit (LSF) to temperature and ΔR 3510. Then, the Δ (delta) offset and the A slope are converted to the Westinghouse reference slope and offset 3512 to calculate the coefficients 3514. The coefficients are slope and offset for the Westinghouse reference equation.

Figure 38:
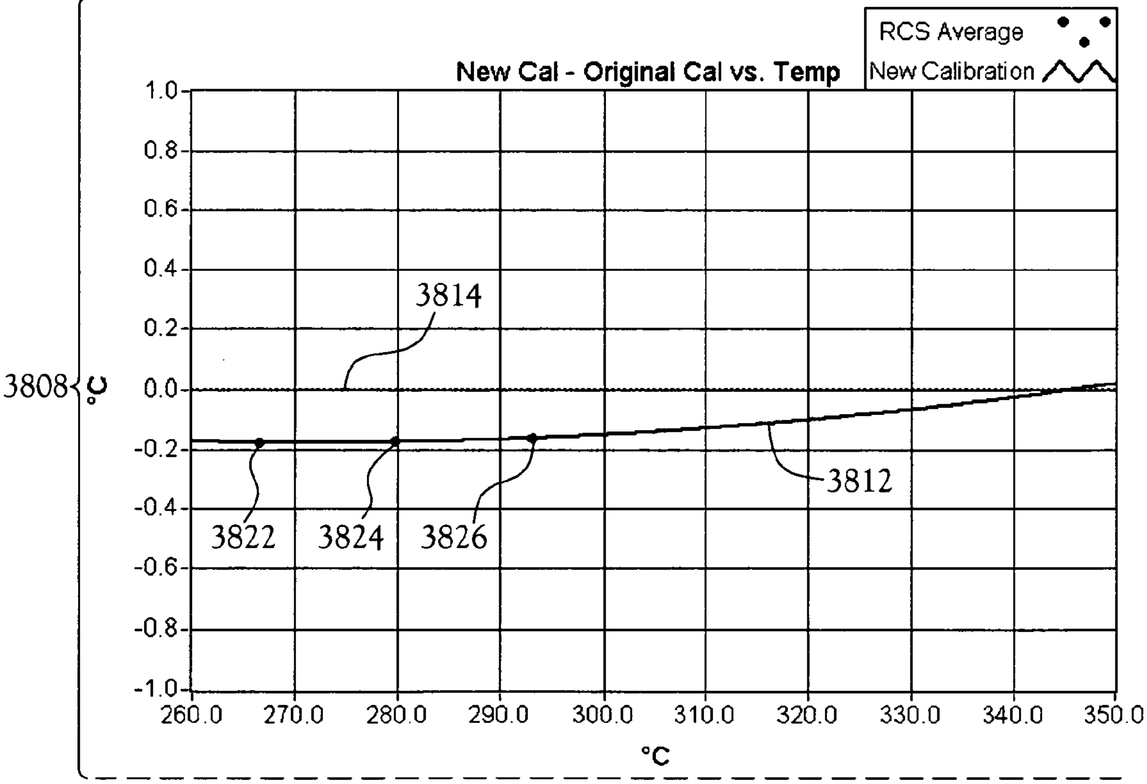
FIG. 38 illustrates an example screen shot of an RTD calibration plot.

FIG. 36 illustrates a block diagram of one embodiment of the functional steps for producing a recalibration minus original calibration plot for a deviating RTD 2806. The steps of FIG. 36 provide a comparison of out of tolerance instrument measurements to the average measurements. FIG. 38 illustrates an example screen shot showing an RTD calibration plot 3808 of new calibration values minus original calibration values versus temperature. The first step shown on FIG. 36 is to calculate the resistance with the original equation and coefficients for the RTD 3602. The next step is to calculate a new temperature with new calibration coefficients 3604. The next step is to subtract the original temperature from the new temperature 3606. The next step is to calculate the resistance with the original equation 3608. The next step is to calculate the original temperature from the recalibration resistance data 3610. The next step is to subtract the original recalibration temperature from the recalibration temperature data 3612. The final illustrated step is to plot the recalibration data versus the original data 3614.

The first three steps 3602, 3604, 3606 illustrated in FIG. 36 calculate a curve 3812 (illustrated in FIG. 38) determined from subtracting the original calibration values from the recalibration values. This curve 3812 is shown in relation to an abscissa 3814 at zero. The first step 3602 determines the resistance value corresponding to the measured temperature, using the original coefficients with the equation to calculate the temperature from a resistance. The calculated resistance is the actual resistance corresponding to the temperature as measured by the instrument. The second step 3604 calculates a new temperature based on the actual resistance determined in the previous step 3602 and the equation with the new coefficients. The third step 3606 determines the difference between the temperature as measured and the new temperature (the temperature as calculated). These differences define the curve 3812.

Steps four through six 3608, 3610, 3612 illustrated in FIG. 36 calculate specific points 3822, 3824, 3826 on the previously determined curve 3812 shown on FIG. 38. These three steps 3608, 3610, 3612 are somewhat similar to the first three steps 3602, 3604, 3606; however, they are applied to the individual data points for the out of tolerance instrument. The fourth step 3608 determines the resistance corresponding to the temperature using the equation with the original coefficients. This calculation is performed for the out of tolerance instrument at a specified point. The fifth step 3610 determines a calculated temperature from the recalibration resistance data. The sixth step 3612 determines the difference between the original temperature value and the recalibration temperature data. In another embodiment, the temperature of the out of tolerance instrument is retrieved from the data file or another stored variable instead of recalculating the temperature.

The final step 3614 illustrated in FIG. 36 produces the results of the previous calculations. The results, in various embodiments, is a display, a printout, a chart, a plot, or other depiction of the calculation results made available to the operator. On embodiment of the results are illustrated in FIG. 38.

FIG. 38 illustrates an example screen shot of RTD calibration information. The information is shown in four regions: one region identifies the instrument 3802, the second shows the recalibration data 3804, the third shows the quadratic equation calibration coefficients 3806 for the instrument, and the fourth region shows an RTD calibration plot 3808. The recalibration data 3804 includes the temperature and the corresponding resistance and uncertainty for the instrument.

Figure 39:
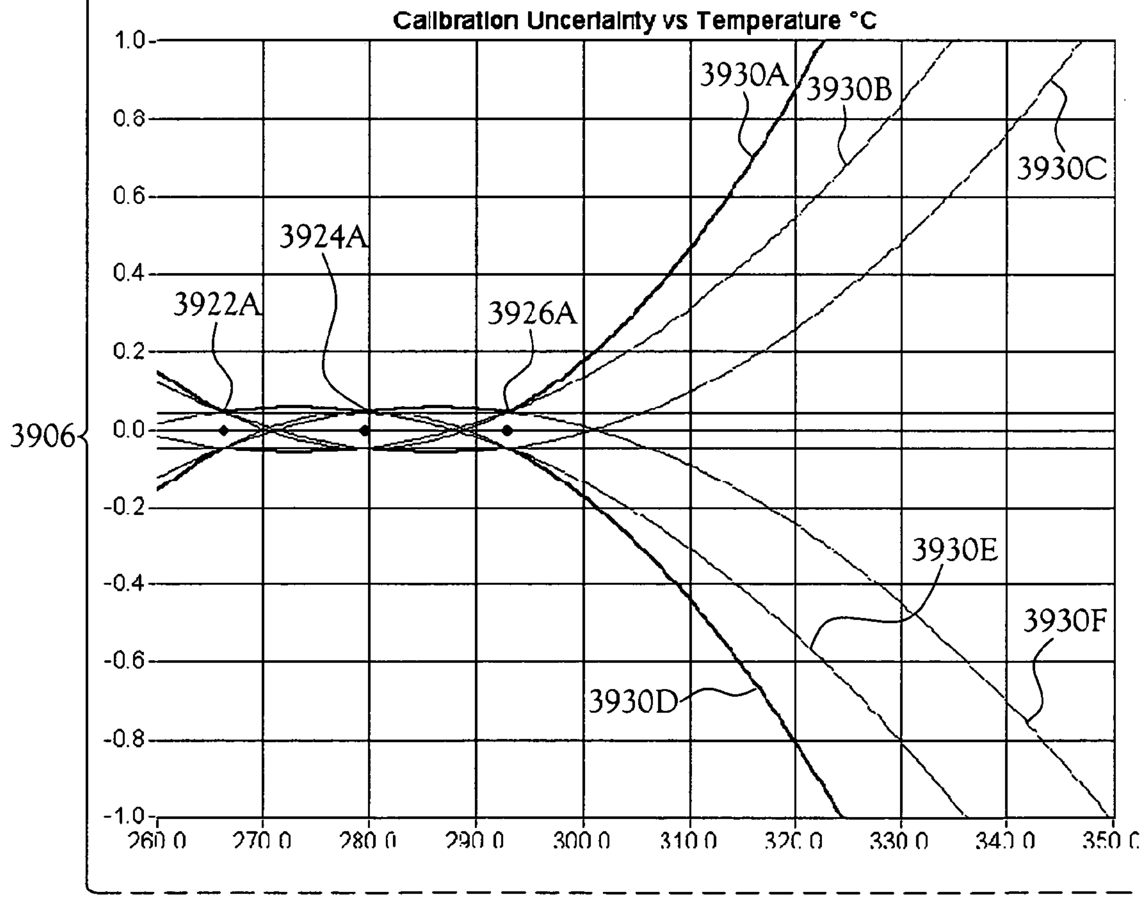
FIG. 39 illustrates an example screen shot of an RTD calibration uncertainty plot.

FIG. 37 illustrates a block diagram of one embodiment of the functional steps for calculating the recalibration uncertainty for a deviating RTD 2808. FIG. 39 illustrates one example of a plot of calibration uncertainty versus temperature. The first step shown in FIG. 37 is to subtract the uncertainty from the temperature for the RTD 3702. The next step is to calculate new coefficients based on the calibration type 3704. The next step is to subtract the original coefficients from the new coefficients 3706. The next step is to determine whether all the permutations have been calculated 3708. These permutations include every combination of uncertainties for the data points. If not, then the next step is to add the uncertainty to the next combination 3710 and then repeat calculating new coefficients 3704. If all permutations have been calculated, the next step is to calculate the maximum and minimum deviation for each temperature 3712. The maximum and minimum deviation identifies the bounds for each temperature. The final step 3714 illustrated in FIG. 37 produces the results of the previous calculations. The results, in various embodiments, is a display, a printout, a chart, a plot, or other depiction of the calculation results made available to the operator. On embodiment of the results are illustrated in FIG. 39.

FIG. 39 illustrates an example screen shot of RTD calibration uncertainty information. The information is shown in four regions: one region identifies the instrument 3902, the second shows the recalibration data 3904, and the third region shows an RTD calibration uncertainty plot 3906. The recalibration data 3904 includes the temperature and the corresponding resistance and uncertainty for the instrument.

Referring to the RTD calibration uncertainty plot 3906 on FIG. 39, for each of the temperature points 3912, 3914, 3916, there is an associated uncertainty, plus 3922A, 3924A, 3926A and minus 3922B, 3924B, 3926B. A set of curves 3930A-F are fit to each combination of uncertainty applied to the data points 3912, 3914, 3916. The set of curves 3930A-F are useful for extrapolating the range of uncertainty for data points outside the region bounded by the known or measured 3912, 3914, 3916. For example, in one embodiment, the known data points are taken within a narrow operating range. The limits on the process are either above or below normal operating ranges. By extrapolating the calibration curves with uncertainty, the limits can be evaluated to determine whether they should be adjusted to account for the extrapolated curves 3930A-F.

FIG. 40 illustrates one embodiment of a screen shot of an RTD calibration table. The information is shown in three regions: one region identifies the instrument 4002, the second shows the calibration constants, or coefficients, 4004, and the third region shows the calibration resistance for a range of temperatures 4006.

In one embodiment, each of the functions identified in FIGS. 3 to 37 are performed by one or more software routines run by the cross calibration processor 126. In another embodiment, one or more of the functions identified are performed by hardware and the remainder of the functions are performed by one or more software routines run by the processor 126.

The cross calibration processor 126 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function. Those skilled in the art will recognize that it is possible to program a general-purpose computer or a specialized device to implement the invention.

The automated system for cross calibration includes several functions, both hardware and software. The system includes a function for communicating with a plant monitoring system. In one embodiment, the function of communicating is performed via a network connection between the cross calibration processor 126 and the plant monitoring system 240. The system includes a function for processing, which, in one embodiment, is performed by the cross calibration processor 126.

The system includes a function for performing a cross calibration of plant instruments. In one embodiment, the function of cross calibration is performed by retrieving data 302 from the plant monitoring system 240, determining the average temperatures 306 of the various temperature instruments, determining if there are any deviations 308 from the averages, and for deviations outside a range 310, determining new coefficients, or calibration curves, 312. For those instruments with no deviations, there is no change 314. In another embodiment, the data sorted 304 after it is retrieved 302. In still another embodiment, the data is loaded 402, data points are selected 404, fluctuation data is removed 406, and the data is analyzed 408. In another embodiment, after the data is analyzed 408, deviating or outlying RTDs are recalibrated 414. In yet another embodiment, after the data is analyzed 408, an RTD report 410 and/or a CET report 412 is made available.

The system includes a function for recalibrating a deviating instrument. In one embodiment, the function of recalibrating is performed by the step of recalibrating the RTD 414, as executed by the cross calibration processor 126. In another embodiment, the function of recalibrating is performed by the cross calibration processor 126 executing the steps of calculating the resistance value versus temperature 2802, calculating new coefficients 2804. In another embodiment, the function of recalibrating is performed by additionally producing a recalibration minus calibration plot 2806. In still another embodiment, the function of recalibrating is performed by additionally calculating recalibration uncertainty 2808.

From the foregoing description, it will be recognized by those skilled in the art that methods and apparatus for an automated system for cross calibration has been provided. The automated system includes a processor 126 in communication with a plant computer 122 and plant data storage unit 124 or a plant monitoring system 240. The processor 126 extracts operating data for a collection of instruments 104 and performs a cross-calibration using that data.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. An apparatus for automating cross calibrations of plant instruments, said apparatus comprising:

a processor in communication with a data storage system, said data storage system being a part of a plant monitoring system, said processor programmed to execute a process including loading a data set from said data storage system, said data set including a plurality of measured process values from a plurality of instruments, said plurality of instruments including at least one redundant instrument, said plurality of measured process values including a plurality of temperature measurements obtained during isothermal conditions, wherein said process step of loading a data set includes selecting a file, loading a set of resistance temperature device (RTD) data, calculating RTD averages from said set of RTD data, loading a set of thermocouple data, calculating thermocouple averages from said set of thermocouple data, and matching timeslices, selecting for analysis a set of data from said data set, removing a set of deviating data from said set of data, analyzing a set of remaining data for cross-calibration, and recalibrating any one of said plurality of instruments that produce at least one data point in said set of deviating data.

2. An apparatus for automating cross calibrations of plant instruments, said apparatus comprising:

a processor in communication with a data storage system, said data storage system being a part of a plant monitoring system, said processor programmed to execute a process including loading a data set from said data storage system, said data set including a plurality of measured process values from a plurality of instruments, said plurality of instruments including at least one redundant instrument, said plurality of measured process values including a plurality of temperature measurements obtained during isothermal conditions, selecting for analysis a set of data from said data set, removing a set of deviating data from said set of data, wherein said process step of removing said set of deviating data includes calculating an average narrow range standard deviation value, calculating a fluctuation standard deviation value of average narrow range fluctuations, rejecting a timeslice for said fluctuation standard deviation outside a specified range, and matching thermocouple times to resistance temperature device (RTD) times, analyzing a set of remaining data for cross-calibration, and recalibrating any one of said plurality of instruments that produce at least one data point in said set of deviating data.

3. An apparatus for automating cross calibrations of plant instruments, said apparatus comprising:

a processor in communication with a data storage system, said data storage system being a part of a plant monitoring system, said processor programmed to execute a process including loading a data set from said data storage system, said data set including a plurality of measured process values from a plurality of instruments, said plurality of instruments including at least one redundant instrument, said plurality of measured process values including a plurality of temperature measurements obtained during isothermal conditions, wherein said set of data includes a set of resistance temperature device (RTD) data and a set of thermocouple data, said process step of analyzing said set of remaining data includes calculating a set of RTD deviations from said set of RTD data, calculating an average value and a standard deviation value from said set of RTD deviations, calculating a set of thermocouple deviations from said set of thermocouple data, and calculating an average of said set of thermocouple deviations, selecting for analysis a set of data from said data set, removing a set of deviating data from said set of data, analyzing a set of remaining data for cross-calibration, and recalibrating any one of said plurality of instruments that produce at least one data point in said set of deviating data.

4. An apparatus for automating cross calibrations of plant instruments, said apparatus comprising:

a processor in communication with a data storage system, said data storage system being a part of a plant computer system, said processor programmed to execute a process including:

loading a data set from said data storage system, said data set including a plurality of measured process values from a plurality of instruments, selecting for analysis a set of data from said data set, said set of data including a set of resistance temperature device (RTD) data and a set of thermocouple data, removing a set of deviating data from said set of data, and analyzing a set of remaining data for cross-calibration of said plurality of instruments, said process step of analyzing further including calculating a set of RTD deviations from said set of RTD data, calculating an average value and a standard deviation value from said set of RTD deviations, calculating a set of thermocouple deviations from said set of thermocouple data, and calculating an average of said set of thermocouple deviations, said set of thermocouple deviations stored for reporting of said set of thermocouple deviations.

5. An apparatus for automating cross calibrations of plant instruments, said apparatus comprising:

a processor in communication with a data storage system, said data storage system being a part of a plant computer system, said processor programmed to execute a process including:

loading a data set from said data storage system, said data set including a plurality of measured process values from a plurality of instruments, wherein said process step of loading a data set includes selecting a file, loading a set of resistance temperature device (RTD) data, calculating RTD averages from said set of RTD data, loading a set of thermocouple data, calculating thermocouple averages from said set of thermocouple data, and matching timeslices, selecting for analysis a set of data from said data set, removing a set of deviating data from said set of data, and analyzing a set of remaining data for cross-calibration of said plurality of instruments with a set of results of said step of analyzing stored for reporting of said set of results.

6. An apparatus for automating cross calibrations of plant instruments, said apparatus comprising:

a processor in communication with a data storage system, said data storage system being a part of a plant computer system, said processor programmed to execute a process including:

retrieving a data set from said data storage system, said data set including a plurality of measured process values from a plurality of instruments, after said step of retrieving said data set, sorting said data set, determining at least one average value from said data set, determining a set of deviating data from said data set, and determining new coefficients for any one of said plurality of instruments that produce at least one data point in said set of deviating data, said new coefficients stored for reporting of said new coefficients.

7. Computer readable media tangibly embodying a program of instructions executable by a computer to perform a method of automating cross calibrations of plant instruments, said method comprising:

(a) retrieving a data set from a data storage unit, said data storage unit being a part of a plant monitoring system, said data set including a plurality of measured process values from a plurality of resistance temperature device (RTD) instruments;

(b) selecting for analysis a set of data from said data set;

(c) after said step (b) selecting for analysis, removing a set of deviating data from said set of data to produce a set of remaining data, wherein said step of removing said set of deviating data includes calculating an average narrow range standard deviation value, calculating a fluctuation standard deviation value of average narrow range fluctuations, rejecting a timeslice for said fluctuation standard deviation outside a specified range, and matching thermocouple times to RTD times;

(d) analyzing said set of remaining data; and (e) recalibrating any one of said plurality of instruments that produce at least one data point in a set of deviating data produced from said step (d) of analyzing.

8. Computer readable media tangibly embodying a program of instructions executable by a computer to perform a method of automating cross calibrations of plant instruments, said method comprising:

(a) retrieving a data set from a data storage unit, said data storage unit being a part of a plant monitoring system, said data set including a plurality of measured process values from a plurality of resistance temperature device (RTD) instruments, wherein said step (a) of loading a data set includes selecting a file, loading a set of RTD data, calculating RTD averages from said set of RTD data, loading a set of thermocouple data, calculating thermocouple averages from said set of thermocouple data, and matching timeslices;

(b) selecting for analysis a set of data from said data set;

(c) analyzing a set of remaining data from said set of data after any deviate data is removed; and (d) recalibrating any one of said plurality of instruments that produce at least one data point in a set of deviating data produced from said step (d) of analyzing.

9. Computer readable media tangibly embodying a program of instructions executable by a computer to perform a method of automating cross calibrations of plant instruments, said method comprising:

(a) retrieving a data set from a data storage unit, said data storage unit being a part of a plant monitoring system, said data set including a plurality of measured process values from a plurality of resistance temperature device (RTD) instruments;

(b) selecting for analysis a set of data from said data set, wherein said set of data includes a set of RTD data and a set of thermocouple data;

(c) analyzing a set of remaining data from said set of data after any deviate data is removed, wherein said step (c) of analyzing said set of remaining data includes calculating a set of RTD deviations from said set of RTD data, calculating an average value and a standard deviation value from said set of RTD deviations, calculating a set of thermocouple deviations from said set of thermocouple data, and calculating an average of said set of thermocouple; and (d) recalibrating any one of said plurality of instruments that produce at least one data point in a set of deviating data produced from said step (d) of analyzing.

* * * * *